(12) United States Patent
Habe et al.

(10) Patent No.: US 12,243,210 B2
(45) Date of Patent: Mar. 4, 2025

(54) MAINTENANCE SUPPORT SYSTEM, MAINTENANCE SUPPORT METHOD, PROGRAM, METHOD FOR GENERATING PROCESSED IMAGE, AND PROCESSED IMAGE

(71) Applicant: SPP TECHNOLOGIES CO., LTD., Tokyo (JP)

(72) Inventors: Takeshi Habe, Hyogo (JP); Norihiro Tsujioka, Hyogo (JP)

(73) Assignee: SPP TECHNOLOGIES, CO., LTD., Tokyo (JP)

( * ) Notice: Subject to any disclaimer, the term of this patent is extended or adjusted under 35 U.S.C. 154(b) by 199 days.

(21) Appl. No.: 17/053,829

(22) PCT Filed: Mar. 19, 2020

(86) PCT No.: PCT/JP2020/012325
§ 371 (c)(1),
(2) Date: Nov. 9, 2020

(87) PCT Pub. No.: WO2020/196276
PCT Pub. Date: Oct. 1, 2020

(65) Prior Publication Data
US 2022/0012868 A1    Jan. 13, 2022

(30) Foreign Application Priority Data

Mar. 22, 2019  (WO) .................. PCT/JP2019/012279
Jul. 16, 2019  (WO) .................. PCT/JP2019/027986

(51) Int. Cl.
*G06K 9/00*    (2022.01)
*G02B 27/01*   (2006.01)
*G06T 7/00*    (2017.01)

(52) U.S. Cl.
CPC .......... *G06T 7/0004* (2013.01); *G02B 27/017* (2013.01); *G02B 2027/0138* (2013.01);
(Continued)

(58) Field of Classification Search
CPC ............ G02B 2027/014; G02B 27/017; G02B 2027/0138; G06T 2207/30204;
(Continued)

(56) References Cited

U.S. PATENT DOCUMENTS 8,305,448 B2 * 11/2012 Yoda ...................... H04N 23/80
348/211.1
2014/0240313 A1 * 8/2014 Varga ................... H04N 13/383
345/419

(Continued)

FOREIGN PATENT DOCUMENTS

JP    2012-054891    3/2012
JP    2017-211766    11/2017
(Continued)

OTHER PUBLICATIONS

T. Orekondy, M. Fritz and B. Schiele, "Connecting Pixels to Privacy and Utility: Automatic Redaction of Private Information in Images," 2018 IEEE/CVF Conference on Computer Vision and Pattern Recognition, Salt Lake City, UT, USA, 2018, pp. 8466-8475, doi: 10.1109/CVPR.2018.00883. (Year: 2018).*

(Continued)

*Primary Examiner* — Gregory A Morse
*Assistant Examiner* — Kevin M Coomber
(74) *Attorney, Agent, or Firm* — MILLEN, WHITE, ZELANO & BRANIGAN, P.C.; Christopher W. Brody

(57) ABSTRACT

A maintenance support system prevents leakage of confidential information by excluding a maintenance target while imposing few restrictions on imaging conditions. A maintenance support system 100 includes a wearable terminal 1
(Continued)

including an imaging device 12, a first identifying device 31 configured to identify a first three-dimensional area TA including a maintenance target T with reference to a predetermined reference point M, and a second identifying device 32 configured to identify a mask pixel area excluding an effective pixel area corresponding to the first three-dimensional area for a captured image acquired by the imaging device in a post-movement state in which the wearable terminal has moved. A processed-image generating device 33 is configured to generate a processed image in which the mask pixel area is made invisible and a communication device 34 is configured to transmit the processed image to a support terminal 2.

10 Claims, 10 Drawing Sheets

(52) U.S. Cl.
CPC .............. *G02B 2027/014* (2013.01); *G06T 2207/30204* (2013.01)

(58) Field of Classification Search
CPC ..... G06T 5/005; G06T 19/006; G06T 7/0004; G06V 10/443; H04N 21/21805; G06Q 10/20; G06Q 10/06398
See application file for complete search history.

(56) References Cited

U.S. PATENT DOCUMENTS

| | | | | |
|---|---|---|---|---|
| 2016/0125653 | A1* | 5/2016 | Denis | G06F 3/012 |
| | | | | 348/90 |
| 2016/0328627 | A1* | 11/2016 | Fujii | H04M 11/00 |
| 2017/0249745 | A1 | 8/2017 | Fiala | |
| 2018/0284453 | A1* | 10/2018 | Irvin | G06T 19/006 |
| 2019/0347783 | A1* | 11/2019 | Salgian | G02B 27/017 |
| 2019/0370544 | A1* | 12/2019 | Wright, Jr. | G06Q 10/20 |

FOREIGN PATENT DOCUMENTS

| | | | | |
|---|---|---|---|---|
| JP | 2017211766 A | * | 11/2017 | ............ G06T 1/00 |
| JP | 2018-036812 | | 3/2018 | |
| JP | 2018036812 A | * | 3/2018 | |

OTHER PUBLICATIONS

Chinese Office Action issued in Chinese Patent Application No. 202080004994.8 dated May 15, 2024 and its English translation.

* cited by examiner

MAINTENANCE SUPPORT SYSTEM, MAINTENANCE SUPPORT METHOD, PROGRAM, METHOD FOR GENERATING PROCESSED IMAGE, AND PROCESSED IMAGE

TECHNICAL FIELD

The present invention relates to a maintenance support system, a maintenance support method, a program, a method for generating a processed image, and a processed image for supporting maintenance work of industrial equipment which is a maintenance target. In particular, the present invention relates to a maintenance support system, a maintenance support method, a program, a method for generating a processed image, and a processed image, which can prevent leakage of confidential information etc. excluding industrial equipment which is the maintenance target, and in which there are few restrictions on imaging conditions.

BACKGROUND ART

Conventionally, when a trouble occurs in industrial equipment such as a substrate processing apparatus, generally action taken in response thereto is such as follows: a maintenance worker who is at the installation site of the industrial equipment which is the maintenance target confirms the status of the trouble, and then reports the status by telephone to a maintenance supporter of the manufacturer of the maintenance target so that the maintenance supporter gives various instructions to the maintenance worker by telephone.

If the trouble cannot be solved even after the above-described action by telephone is taken, a further action is taken such that a skilled worker of the manufacturer is dispatched to the installation site of the maintenance target at a timing when the skilled worker is available.

In the case of the above-described action by telephone, since the communication is verbal communication, there is a case in which the status of the trouble may not be well communicated to the maintenance supporter, or the instruction of the maintenance supporter cannot be well communicated to the maintenance worker resulting in that the trouble cannot be solved. Although, the maintenance worker may send an obtained captured image of the maintenance target to the maintenance supporter by e-mail, etc., as needed, and the maintenance supporter checks the captured image to grasp the status of the trouble, a problem exists in that understanding the status takes time.

Further, in the case of the above-described action in which a skilled worker is dispatched, a problem exists in that taking immediate action is difficult.

In order to solve the problems as described above, there is proposed a maintenance support system in which a maintenance worker wears a wearable terminal (head-mounted display) equipped with an imaging device and a display, and an image of a maintenance target is captured by using the wearable terminal so that this captured image (video image) is transmitted to a support terminal through a telecommunication line such as the Internet.

However, in the above-described maintenance support system, if a captured image is transmitted as it is to the support terminal, there is a risk that the captured image includes confidential information of the installation site. When the captured image including the confidential information is transmitted to the maintenance supporter side, the maintenance supporter can know the confidential information, thus causing a problem.

Accordingly, as a maintenance support system capable of preventing leakage of confidential information, for example, a maintenance support system according to Patent Literature 1 (an image processing system in Patent Literature 1) has been proposed.

The system described in Patent Literature 1 is an image processing system (claim 1 of Patent Literature 1) including: an acquisition unit that acquires an original image that captures an original area; a recognition unit that recognizes one or more identifiers in the original image; an identifying unit that identifies at least one of a first image portion which captures a first area of the original area and a second image portion that captures a second area which is an area of the original area excluding the first area, based on the one or more identifiers recognized at the recognition unit; and a generation unit that generates a processed image including the first image portion according to an identified result by the identifying unit.

According to the system described in Patent Literature 1, it is considered that leakage of confidential information etc., can be prevented by arranging such that the first area is the maintenance target, and the second area is confidential information etc. excluding the maintenance target.

However, the system described in Patent Literature 1 has a restriction that the original image must always include an identifier. Specifically, while Patent Literature 1 shows an example in which an internal area (a rectangular area surrounded by four identifiers 30) of a printing apparatus 300 is the maintenance target, and the original area varies according to the movement of a worker 10 who wears a wearable tool 100 including a camera 170 so that original images 171a to 173a that capture different original areas are acquired, it is stated that the identifier 30 must be included in each of the original images 171a to 173a (paragraphs 0063 to 0065, FIG. 6, and FIG. 7, etc., of Patent Literature 1).

Therefore, for example, when an attempt is made to capture an image of details of the maintenance target in close proximity to the maintenance target, a restriction occurs in that the maintenance target can be approached only within a range in which the identifier is included in the original image.

Further, since the system according to Patent Literature 1 is configured such that the first image portion (the portion corresponding to the maintenance target) is two-dimensionally identified with reference to the identifier, there is a restriction that the image of the maintenance target to which the identifier is bonded must be captured from a specific one direction opposed to the identifier.

CITATION LIST

Patent Literature

[Patent Literature 1] JP2017-211766A

SUMMARY OF INVENTION

Technical Problem

An object of the present invention, which has been made to solve the above-described problems of conventional arts, is to provide a maintenance support system, a maintenance support method, a program, a method for generating a processed image, and a processed image, which can prevent leakage of confidential information etc. excluding industrial equipment which is the maintenance target, and in which there are few restrictions on imaging conditions.

Solution to Problem

To solve the problems, the present invention provides a maintenance support system comprising: a wearable terminal including an imaging device and worn by a maintenance worker; a first identifying device configured to identify a predetermined first three-dimensional area including industrial equipment that is a maintenance target and/or to identify a predetermined second three-dimensional area excluding the industrial equipment that is the maintenance target, with reference to a predetermined reference point in a captured image acquired by the imaging device in an initial state; a second identifying device configured to identify a mask pixel area excluding an effective pixel area corresponding to the first three-dimensional area and/or to identify a mask pixel area corresponding to the second three-dimensional area, in the captured image acquired by the imaging device, in a post-movement state in which the wearable terminal has moved; a processed-image generating device configured to generate a processed image in which the mask pixel area identified by the second identifying device is made invisible for the captured image acquired by the imaging device in the post-movement state; and a communication device configured to transmit the processed image generated by the processed-image generating device to a support terminal operated by a maintenance supporter.

According to the present invention, the predetermined first three-dimensional area including the industrial equipment which is the maintenance target and/or the predetermined second three-dimensional area excluding the industrial equipment which is the maintenance target are/is identified by the first identifying device, with reference to a predetermined reference point in the captured image acquired by the imaging device in the initial state. The "imaging device in the initial state" in the present invention means the imaging device in a state in which the predetermined reference point is located in the captured image.

Specifically, for example, when an arbitrary point of a captured image is designated by using an AR cursor and the designated position is used as a reference point, the "imaging device in the initial state" means the imaging device which is located at a position where image of the point designated by using the AR cursor can be captured.

Further, for example, when a pixel area corresponding to a characteristic portion (for example, a corner portion of the maintenance target) in the captured image is extracted by the first identifying device performing predetermined image processing on the captured image, and a center, etc., of this pixel area is used as the reference point, the "imaging device in the initial state" means the imaging device located at a position where image of a characteristic portion can be captured.

Further, for example, when the reference point is defined by a marker attached to a maintenance target or the like, the "imaging device in the initial state" means the imaging device located at a position where an image of the marker can be captured.

Further, when the first three-dimensional area and the second three-dimensional area are, for example, three-dimensional areas having a rectangular parallelepiped shape, these will be defined by the coordinates of eight respective vertices of a three-dimensional area represented by the three-dimensional coordinate system with reference to a reference point.

In the above-described case, for example, by causing the coordinates of each vertex with reference to a reference point to be stored in advance in the first identifying device, or designating each vertex by using the AR cursor, and utilizing SLAM (Simultaneous Localization and Mapping) technique, which is known as a technique for constructing an environment map of the self-position and the surroundings of a sensor in an unknown environment, the first identifying device can identify the first three-dimensional area and/or the second three-dimensional area.

FIG. 10 is an explanatory diagram illustrating an outline of the SLAM technique.

As shown in FIG. 10, in the SLAM technique, the following first to fourth steps are carried out.

(1) First step: First, corresponding identical points (characteristic points) are detected in two captured images obtained by capturing images of the imaging target at different times t0 and t1. In the example shown in FIG. 10, corner portions of the imaging target are detected as the characteristic point.

(2) Second step: Next, by comparing the positions of the characteristic points in the two captured images, the amount of change in the posture of the imaging device (translational/rotational components) is calculated. Further, the positions of the characteristic points in the three-dimensional space are obtained from the combination of the characteristic points by the principle of triangulation. This corresponds to the construction of the environment map.

(3) Third step: Further, in the two captured images obtained by capturing the image of the imaging target at different times t1 and t2, the change in the position of the characteristic point in a three-dimensional space is obtained, and the self-position of the imaging device is estimated from this change.

(4) Fourth step: The characteristic points are registered and updated on the three-dimensional space (updating of the environment map).

Hereinafter, in the SLAM technique, the third and fourth steps will be repeatedly carried out.

As described above, the SLAM technique is a technique for always grasping the three-dimensional space by alternately repeating the construction of the environment map (restoration of the three-dimensional shape) and the estimation of the self-position of the imaging device.

The reference point in the present invention is arbitrarily set on the three-dimensional space after the environment map is constructed (the three-dimensional shape is restored, in other words, the three-dimensional space is grasped).

More specific contents of the SLAM technique are described in, for example, Information Processing Society of Japan, Technical Report Vol. 2014-CVIM-190 No. 40, "3D shape restoration/self-position estimation (SLAM) and high-density 3D shape restoration from moving camera image (translation from Japanese)" and is publicly known, and therefore detailed description thereof will be omitted in the present description.

Next, according to the present invention, in a post-movement state in which the wearable terminal has moved, a mask pixel area excluding the effective pixel area corresponding to the first three-dimensional area in the captured image acquired by the imaging device is identified and/or a mask pixel area corresponding to the second three-dimensional area in the captured image acquired by the imaging device is identified by the second identifying device. When only the first three-dimensional area is identified by the first identifying device, a mask pixel area excluding the effective pixel area corresponding to the first three-dimensional area is identified by the second identifying device. Moreover, when only the second three-dimensional area is identified by the first identifying device, a mask pixel area corresponding to the second three-dimensional area is identified by the second identifying device. Further, when the first three-dimensional area and the second three-dimensional area are identified by the first identifying device, a mask pixel area excluding an effective pixel area corresponding to the first three-dimensional area and a mask pixel area corresponding to the second three-dimensional area are identified by the second identifying device.

As described above, since the first three-dimensional area and/or the second three-dimensional area with reference to the reference point in the captured image acquired by the imaging device in the initial state have/has been identified by the first identifying device, in the post-movement state in which the wearable terminal has moved, the first three-dimensional area and/or the second three-dimensional area with reference to the reference point in the captured image acquired by the imaging device can be identified by using, for example, the SLAM technique. Then, upon identifying the first three-dimensional area and/or the second three-dimensional areas in the post-movement state, a reference point does not necessarily need to be included in the captured image acquired by the imaging device in the post-movement state.

Next, according to the present invention, a processed image in which a mask pixel area identified by the second identifying device (the mask pixel area excluding the effective pixel area corresponding to the first three-dimensional area and/or the mask pixel area corresponding to the second three-dimensional area) are/is made invisible is generated by the processed-image generating device. Examples of the "processed image in which the mask pixel area is made invisible" in the present invention include an image in which although the reflected area is the same as in the captured image, the mask pixel area in the captured image is dark filled, and an image obtained by cutting out only pixel areas other than the mask pixel area from a captured image.

When the mask pixel area identified by the second identifying device is a mask pixel area excluding the effective pixel area corresponding to the first three-dimensional area, since the first three-dimensional area includes the maintenance target and the effective pixel area corresponds to the first three-dimensional area, the processed image in which the mask pixel area excluding the effective pixel area is made invisible will not include a pixel area corresponding to confidential information, etc. excluding the maintenance target unless the first three-dimensional area is made excessively larger than the maintenance target.

Further, when the mask pixel area identified by the second identifying device is a mask pixel area corresponding to the second three-dimensional area, the second three-dimensional area does not include a maintenance target. Therefore, if it is set such that the second three-dimensional area includes at least confidential information, etc. excluding the maintenance target, a pixel area corresponding to the confidential information, etc. excluding the maintenance target will not be included in a processed image in which the mask pixel area is made invisible.

Finally, according to the present invention, the processed image generated by the processed-image generating device is transmitted to the support terminal operated by the maintenance supporter through the communication device.

Therefore, on the support terminal, the maintenance target included in the first three-dimensional area is visually recognized and/or the confidential information, etc. excluding the maintenance target included in the second three-dimensional area becomes not visually recognizable, thus making it possible to prevent leakage of confidential information, etc. excluding the maintenance target.

As so far described, according to the present invention, it is sufficient that the captured image acquired by the imaging device in the initial state includes a reference point, and there is no need that the reference point is included in the captured image acquired by the imaging device in the post-movement state in which the wearable terminal has moved. Further, according to the present invention, in order to identify the predetermined first three-dimensional area including the industrial equipment that is the maintenance target and/or to identify the predetermined second three-dimensional area excluding the industrial equipment that is the maintenance target, there is no restriction on the imaging direction of the imaging device. Therefore, it is possible to prevent leakage of confidential information, etc. excluding the maintenance target, and there are few restrictions on the imaging conditions.

The present inventors refer to a technique of generating a processed image in which a mask pixel area excluding the effective pixel area corresponding to the predetermined first three-dimensional area including the maintenance target and/or in which a mask pixel area corresponding to the predetermined second three-dimensional area excluding the maintenance target are/is made invisible as in the present invention, thereby preventing leakage of confidential information etc. excluding the maintenance target included in the mask pixel area as a "Virtual Partition" technique.

The "industrial equipment" in the present invention includes those which are defined as industrial machines by the Japan Society of Industrial Machinery Manufacturers such as mining machinery, chemical machinery, environmental apparatuses, power transmission apparatuses, tanks, commercial washing machines, boilers/motors, plastic machinery, wind and hydraulic machinery, transport machinery, steelmaking machinery, etc. From another perspective, the "industrial equipment" in the present invention includes production apparatuses for producing a tangible object. A substrate processing apparatus is a type of industrial equipment and is also a type of production apparatus for producing a tangible object in view of producing a processed substrate (for example, a substrate subjected to an etching process or a substrate subjected to a film forming process). An IT system in which electronic devices are electrically connected via a server is not included in the production apparatus that produces a tangible object, and is not included in the industrial equipment either.

Further, in the present invention, the term "a post-movement state in which a wearable terminal has moved" means not only a state in which the wearable terminal has arrived at its moving end point (for example, a position of the wearable terminal at the end of maintenance work), but also a state in which it has moved to each position at each predetermined short time pitch in the moving process until arriving at the moving end point. Therefore, in the processed-image generating device, a processed image in which the mask pixel area is made invisible will be generated for all the captured images acquired in real time (at each predetermined short time pitch) by the imaging device until arriving at the movement end point.

In the present invention, it is also possible to adopt a mode in which maintenance support is performed by moving the wearable terminal such that not only the reference point is included in a captured image acquired by the imaging device in the initial state, but also the reference point is always included in a captured image acquired by the imaging device in the post-movement state. However, in such a mode, same restrictions on the imaging conditions as in the system described in Patent Document 1 will occur.

According to the present invention, it is possible to employ a mode in which the reference point does not need to be included in a captured image acquired by the imaging device in the post-movement state. In other words, maintenance support can be performed by removing the restriction on the movement position of the wearable terminal such that the imaging device moves from a position where the reference point exists to a position where the reference point does not exist within the field of view of the imaging device.

In the present invention, for example, the reference point is defined by a marker.

When the reference point is defined by a marker, for example, the first identifying device is configured to grasp a three-dimensional space by using a captured image acquired by the imaging device (for example, by the SLAM technique by use of a captured image) and thereafter to identify a predetermined first three-dimensional area including industrial equipment that is the maintenance target and/or to identify a predetermined second three-dimensional area excluding the industrial equipment that is the maintenance target, with reference to the reference point in the captured image acquired by the imaging device in the initial state.

Preferably, the second identifying device comprises a plurality of second imaging devices with imaging directions different from each other, and identifies the mask pixel area based on captured images acquired by the plurality of the second imaging devices.

According to the above-described preferable configuration, since the second identifying device includes the plurality of second imaging devices with imaging directions different from each other, for example, it is possible to apply the SLAM technique by use of a so-called stereoscopic vision (stereo vision) based on the captured image acquired by the plurality of the second imaging devices. Further, for example, by applying the monocular SLAM technique for each captured image acquired by the second imaging devices and combining these, it is possible to accurately identify the mask pixel area.

Preferably, the wearable terminal is a head-mounted display including a display, and the head-mounted display is configured to be switchable between a state in which the captured image is displayed on the display, and a state in which the processed image is displayed on the display in a visually recognizable manner.

According to the above preferred configuration, in the state of displaying a captured image on the display, for example, unlike the case in which the processed image in which the mask pixel area is dark filled is displayed, there is no portion that obstructs the field of view of the maintenance worker, and therefore it is possible to safely perform the maintenance work. The "state of displaying a captured image" in the above-described preferable configuration means a concept including in addition to a state of actually displaying a captured image acquired by the imaging device on the display as in a MR head set (a state in which the maintenance worker visually recognizes the displayed captured images), a state in which the display is of a transmission type, like a transmission type AR headset, and the maintenance worker can directly see the maintenance target through the transmission type display in which nothing is displayed.

On the other hand, according to the above-described preferable configuration, in a state of displaying a processed image on the display in a recognizable manner, the maintenance worker can also recognize the processed image transmitted to the support terminal. Therefore, the maintenance worker can confirm that leakage of confidential information, etc. excluding the maintenance target is prevented, which gives a sense of relief to the maintenance worker. Note that a "state of displaying a processed image in a recognizable manner" in the above described preferable configuration includes: a state of displaying the same image as the processed image transmitted to the support terminal (an image in which although the reflected area is the same as in the captured image, the mask pixel area in the captured image is dark filled, and an image obtained by cutting out only pixel areas other than the mask pixel area from a captured image); and in addition to that, a state of displaying an image in which a captured image is overlaid with a boundary line between the mask pixel area and pixel area other than the mask pixel area, or a state of displaying a processed image in a reduced size in a part (for example, one corner) of the display screen, and the like.

Preferably, the first identifying device, the second identifying device, the processed-image generating device, and the communication device are attached to the wearable terminal.

According to the above-described preferable configuration, all the devices for carrying out a series of operations from generating a processed image in which the mask pixel area in the captured image obtained by capturing an image of the maintenance target with the imaging device is made invisible, until transmitting this processed image to the support terminal, is attached to the wearable terminal. This is a configuration of inside-out scheme in which the position of the wearable terminal (imaging device) is detected by a sensor or the like attached to the wearable terminal itself. In the case of a configuration of outside-in scheme in which the position of the wearable terminal is detected by using an external device separate from the wearable terminal (for example, a configuration for detecting the position of a wearable terminal (the position of the imaging device included in the wearable terminal) by using an imaging device or a sensor installed outside the imaging device included in the wearable terminal), although there is an advantage that the power consumption of the wearable terminal is reduced, there are drawbacks such as environmental restrictions such as nonexistence of a shielding object between the external device and the wearable terminal, and high cost caused by the need of a high precision external device. Therefore, by adopting the above-described preferable configuration, it is possible to achieve advantages of lower cost and fewer environmental restrictions.

Preferably, the maintenance support system according to the present invention further comprises the support terminal, wherein the support terminal is configured to be capable of bidirectional data communication with the communication device.

According to the above-described preferable configuration, since the support terminal and the communication device are capable of conducting bidirectional data communication, not only it is possible to transmit processed image from the communication device to the support terminal, but also it is possible to perform effective maintenance work by solely using the maintenance support system according to the present invention, such as transmitting image for maintenance work from the support terminal to the communication device, and transmitting voice data indicating the contents of the maintenance work.

In the above-described preferable configuration, more preferably, the maintenance support system further comprises a server which is electrically connected to the communication device and the support terminal, and in which first identification information and second identification information are stored, the first identification information being identification information of the maintenance worker and the second identification information being identification information of the maintenance supporter, wherein the server determines whether or not identification information transmitted from the communication device to the server matches the first identification information stored in the server, and also determines whether or not identification information transmitted from the support terminal to the server matches the second identification information stored in the server, and enables bidirectional data communication between the communication device and the support terminal via the server when the identification information transmitted from the communication device to the server matches the first identification information, and the identification information transmitted from the support terminal to the server matches the second identification information.

According to the above-described more preferable configuration, the server determines whether or not the identification information transmitted from the communication device to the server matches the first identification information stored in the server (identification information of the maintenance worker). In other words, the server determines whether or not the identification information of the maintenance worker who uses the maintenance support system according to the present invention has been transmitted to the server. Further, the server determines whether or not the identification information transmitted from the support terminal to the server matches the second identification information (identification information of the maintenance supporter) stored in the server. In other words, the server determines whether or not the identification information of the maintenance supporter who uses the maintenance support system according to the present invention has been transmitted to the server. Then, when the identification information transmitted from the communication device to the server matches the first identification information, and the identification information transmitted from the support terminal to the server matches the second identification information (in other words, it is authenticated that both the identification information of the maintenance worker who uses the maintenance support system according to the present invention, and the identification information of the maintenance supporter have been transmitted to the sever), bi-directional data communication between the communication device and the support terminal via the server is enabled.

According to the above-described more preferable configuration, only when it is authenticated that both the identification information of the maintenance worker who uses the maintenance support system according to the present invention, and the identification information of the maintenance supporter have been transmitted to the sever, bi-directional data communication between the communication device and the support terminal is enabled so that only the maintenance workers and maintenance supporters who are determined in advance can use the maintenance support system according to the present invention, and therefore it is possible to more surely prevent leakage of the confidential information, etc. excluding industrial equipment which is the maintenance target.

Note that in addition to the above-described preferable configuration or the above-described more preferable configuration, if the configuration is made such that data communication is enabled from industrial equipment (for example, substrate processing apparatuses), which is the maintenance target, to the support terminal, and if for example, process log data obtained at the maintenance target (measurement values and setting values concerning the process of the maintenance target) is transmitted to the support terminal, the maintenance supporter can instruct contents of maintenance work while referring to these process log data, and perform further effective maintenance work.

To solve the above-described problems, the present invention also provides a maintenance support method by use of a wearable terminal including an imaging device and worn by a maintenance worker, the maintenance support method comprising: a first identifying step of identifying a predetermined first three-dimensional area including industrial equipment which is a maintenance target and/or identifying a predetermined second three-dimensional area excluding the industrial equipment which is the maintenance target, by a first identifying device, with reference to a predetermined reference point in a captured image acquired by the imaging device in an initial state; a second identifying step of identifying a mask pixel area excluding an effective pixel area corresponding to the first three-dimensional area and/or identifying a mask pixel area corresponding to the second three-dimensional area, in the captured image acquired by the imaging device, by a second identifying device, in a post-movement state in which the wearable terminal has moved; a processed-image generating step of generating, by a processed-image generating device, a processed image, wherein the mask pixel area identified in the second identifying step is made invisible for the captured image acquired by the imaging device in the post-movement state; and a communication step of transmitting, by a communication device, the processed image generated in the processed-image generating step to a support terminal.

To solve the above-described problems, the present invention also provides a program for causing the first identifying device, the second identifying device, the processed-image generating device and the communication device to respectively execute the first identifying step, the second identifying step, the processed-image generating step and the communication step included in the above-described maintenance support method.

Note that the present invention can also be provided as a computer (CPU) readable storage medium which stores the above-described program.

To solve the above-described problems, the present invention also provides a method for generating a processed image, comprising: in a captured image acquired by an imaging device included in a wearable terminal worn by a maintenance worker, identifying a mask pixel area excluding an effective pixel area corresponding to a predetermined first three-dimensional area including industrial equipment which is a maintenance target and/or identifying a mask pixel area corresponding to a predetermined second three-dimensional area excluding the industrial equipment which is the maintenance target, and generating a processed image in which the mask pixel area is made invisible.

To solve the above-described problems, the present invention also provides a method for generating a processed image by use of a captured image acquired by an imaging device included in a wearable terminal worn by a maintenance worker, the method comprising: a first identifying step of identifying a predetermined first three-dimensional area including industrial equipment which is a maintenance target and/or identifying a predetermined second three-dimensional area excluding the industrial equipment which is the maintenance target, by a first identifying device, with reference to a predetermined reference point in a captured image acquired by the imaging device in the initial state; a second identifying step of identifying a mask pixel area excluding an effective pixel area corresponding to the first three-dimensional area and/or identifying a mask pixel area corresponding to the second three-dimensional area, in a captured image acquired by the imaging device, by a second identifying device, in a post-movement state in which the wearable terminal has moved; and a processed-image generating step of generating, by processed-image generating device, a processed image in which the mask pixel area identified in the second identifying step is made invisible for a captured image acquired by the imaging device in the post-movement state.

To solve the above-described problems, the present invention also provides a processed image wherein, in a captured image acquired by an imaging device included in a wearable terminal worn by a maintenance worker, a mask pixel area excluding an effective pixel area corresponding to a predetermined first three-dimensional area including industrial equipment which is a maintenance target and/or a mask pixel area corresponding to a predetermined second three-dimensional area excluding the industrial equipment which is the maintenance target are/is made invisible.

To solve the above-described problems, the present invention further provides a processed image generated by the above-described generating method, wherein a mask pixel area excluding an effective pixel area corresponding to the first three-dimensional area including industrial equipment which is the maintenance target and/or wherein a mask pixel area corresponding to the second three-dimensional area excluding the industrial equipment which is the maintenance target are/is made invisible.

Advantageous Effects of Invention

According to the present invention, it is possible to achieve effects of preventing leakage of confidential information, etc. excluding the maintenance target, and reducing restrictions on imaging conditions.

DESCRIPTION OF EMBODIMENTS

Hereinafter, maintenance support systems according to embodiments of the present invention will be described with reference to the appended drawings.

First Embodiment

Figure 1A:
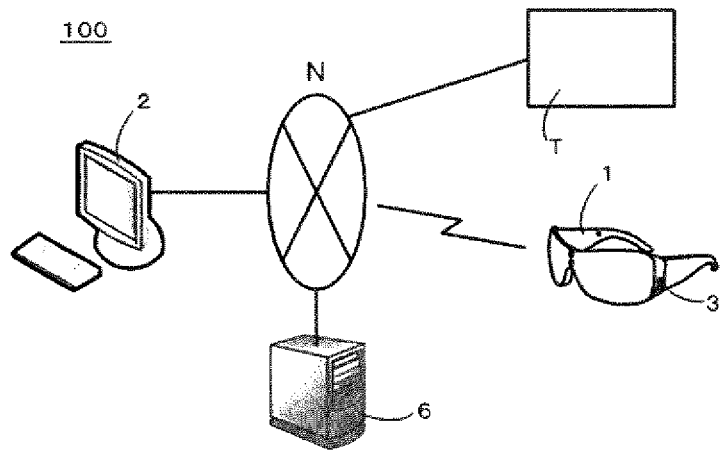
FIG. 1 (FIGS. 1A to 1C) is a diagram to schematically show an outline configuration of a maintenance support system according to a first embodiment of the present invention.
Figure 1B:
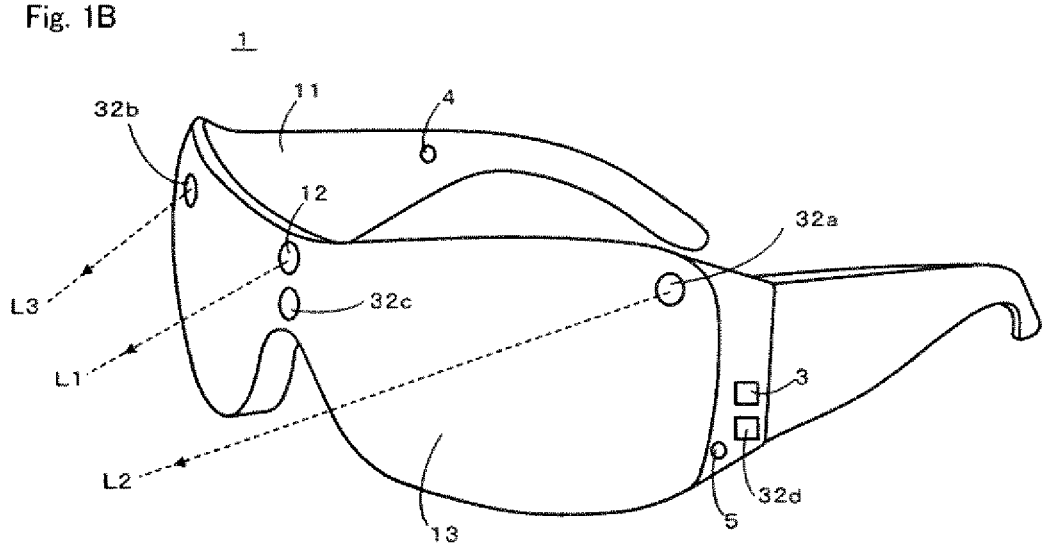
Figure 1C:
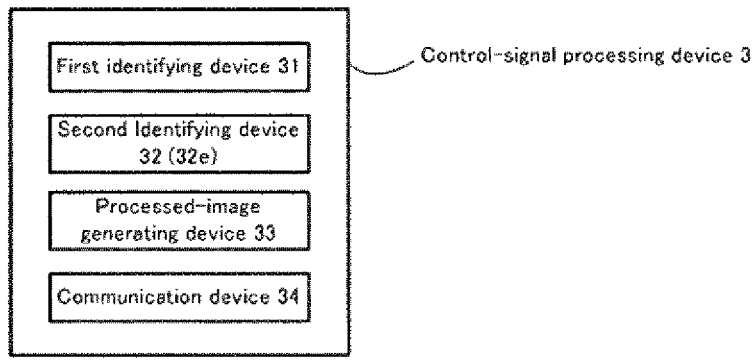

FIG. 1 is a diagram to schematically show an outline configuration of a maintenance support system according to a first embodiment of the present invention. FIG. 1A is a general configuration diagram, FIG. 1B is a diagram showing a wearable terminal and components attached thereto, and FIG. 1C is a block diagram showing the internal structure of the control-signal processing device shown in FIG. 1B.

As shown in FIG. 1A, a maintenance support system 100 according to the present embodiment includes a wearable terminal 1, a support terminal 2, and a control-signal processing device 3. Further, the maintenance support system 100 includes a server 6 as a preferable configuration.

The wearable terminal 1 is a terminal worn by a maintenance worker who performs maintenance work at the installation site of a maintenance target T (industrial equipment such as a substrate processing apparatus).

As shown in FIG. 1B, the wearable terminal 1 of the present embodiment is a glasses-type wearable terminal (head-mounted display), and includes a frame 11 that a maintenance worker puts on his/her ears. The wearable terminal 1 also includes an imaging device 12 at the middle of the front side of the frame 11 (a position corresponding to the vicinity of the middle of forehead of a maintenance worker when the maintenance worker puts the frame 11 on his/her ears). A color (RGB) camera is used as the imaging device 12 of the present embodiment. An imaging direction (line-of-sight direction) L1 of the imaging device 12 is set to be a direction directly facing the middle of forehead of the maintenance worker when the maintenance worker puts the frame 11 on his/her ears. Further, the wearable terminal 1 includes a display 13 which is attached to the front side of the frame 11 and covers a front field of view of the maintenance worker when the maintenance worker puts the frame 11 on his/her ears. As the display 13 of the present embodiment, one of a transmission type is used. Therefore, when nothing is displayed on the display 13, it can be used in the same manner as with ordinary glasses.

Note that the imaging device 12 can be used as a hardware portion of the second identifying device 32 to be described later, as needed.

As shown in FIG. 1B, a plurality of second imaging devices 32a and 32b with imaging directions different from each other are attached to the wearable terminal 1 of the present embodiment. Specifically, in the present embodiment, a pair of second imaging devices 32a and 32b are attached to the left and right end portions on the front side of the frame 11, and an imaging direction (line-of-sight direction) L2 of the second imaging device 32a and an imaging direction (line-of-sight direction) L3 of the second imaging device 32b are set to directions different from each other. As the second imaging devices 32a and 32b, for example, a color (RGB) camera can be used as in the imaging device 12. Further, as the second imaging devices 32a and 32b, for example, a wide-angle camera including a wide-angle lens (including an ultra-wide-angle lens and a fisheye lens) can be used. Note that the second imaging devices 32a and 32b can be used as a hardware portion of the second identifying device 32 to be described later.

As shown in FIG. 1B, a range image sensor (also referred to as a depth camera or a 3D camera) 32c having the substantially same line-of-sight direction as the imaging device 12 is attached to the wearable terminal 1 of the present embodiment. Specifically, the range image sensor 32c is attached below the imaging device 12 at the middle of the front side of the frame 11. As the range image sensor 32c, a range image sensor that measures a distance to an object in the field of view by, for example, the TOF (Time Of Flight) method and acquires a range image in which the distance to the object is represented by a gray level of each pixel. Note that the range image sensor 32c can be used as a hardware portion of the second identifying device 32 to be described later.

Further, an inertial sensor 32d is attached to the wearable terminal 1 of the present embodiment. Specifically, the inertial sensor 32d is attached to a side of the frame 11. The inertial sensor 32d includes, for example, a triaxial acceleration sensor, a triaxial angular velocity sensor (gyro sensor), and a triaxial geomagnetic (azimuth) sensor. Note that the inertial sensor 32d can be used as a hardware portion of the second identifying device 32 to be described later.

Further, a speaker 4 and a microphone 5 are attached to a side of the frame 11 of the wearable terminal 1 of the present embodiment.

The wearable terminal 1 having the above-described configuration can be constructed by using, for example, "HoloLens" (registered trademark), which is smart glasses manufactured by Microsoft Corporation, and improving the same.

The support terminal 2 is a terminal which is generally located at a position remote from the installation site of the maintenance target T and is operated by the maintenance supporter. The support terminal 2 is electrically connected to the wearable terminal 1 (specifically, the control-signal processing device 3 attached to the wearable terminal 1) through a telecommunication line N such as the Internet. Specifically, the support terminal 2 of the present embodiment is electrically connected to the wearable terminal 1 via a server 6 electrically connected to the telecommunication line N. Further, the support terminal 2 is configured to be capable of bidirectional data communication with the communication device 34 to be described later. As the support terminal 2, for example, a desktop computer can be used, but without being limited to this, various terminals such as a laptop computer, a tablet computer, a smartphone, etc., can be used as far as they can display processed images as described below.

Note that the support terminal 2 of the present embodiment is electrically connected to the maintenance target T as well through the telecommunication line N, but this is not an essential configuration. Specifically, in the present embodiment, for example, a computer (not shown in FIG. 1A) that collects process log data of the maintenance target T (measurement values and setting values related to the process of the maintenance target T) is provided, and this computer is electrically connected to the support terminal 2 via the server 6 electrically connected to the telecommunication line N. Thus, a configuration is made such that the process log data obtained at the maintenance target T is sequentially transmitted to the support terminal 2 and is stored in the support terminal 2. By providing the server 6, it becomes easy to manage the identification information and the usage history, of the wearable terminal 1 and the maintenance target T which are connected to the support terminal 2.

The control-signal processing device 3, which is attached to the wearable terminal 1 (on a side of the frame 11), is electrically connected to each component of the imaging device 12, the display 13, the second imaging devices 32a and 32b, the range image sensor 32c, the inertial sensor 32d, the speaker 4 and the microphone 5, and has functions of controlling each component and processing an output signal of each component.

The control-signal processing device 3 is mainly composed of a CPU, a memory such as ROM and RAM, and a program stored in the memory and causing the CPU to execute the operation to be described later.

As shown in FIG. 1C, the control-signal processing device 3 includes a program for causing the CPU to execute the operation as the first identifying device 31, a program for causing the CPU to execute the operation of the software portion 32e of the second identifying device 32, and a program for causing the CPU to execute the operation as the processed-image generating device 33. Further, the control-signal processing device 3 includes a communication device 34. The communication device 34 is composed of an antenna, a program for operating the antenna, and the like.

Updating of the program as described above may be performed by directly connecting a predetermined computer and the control-signal processing device 3 with a USB cable or the like, or may be performed by updating directly from the server 6.

In the present embodiment, all of the first identifying device 31, the second identifying device 32 (the software portion 32e and at least one of the imaging device 12, the second imaging devices 32a and 32b, the range image sensor 32c, and the inertial sensor 32d), the processed-image generating device 33, and the communication device 34 are attached to the wearable terminal 1. As described above, this is a configuration of inside-out scheme in which the position of the wearable terminal 1 (the imaging device 12) is detected by a sensor or the like attached to the wearable terminal 1 itself.

Hereinafter, operation (maintenance support method) of the maintenance support system 100 according to the present embodiment having the outline configuration described above, will be described with reference to FIGS. 2 to 4, in addition to FIG. 1.

First, when using the maintenance support system 100 according to the present embodiment, the server 6 authenticates both the identification information of the maintenance worker and the identification information of the maintenance supporter. Specifically, the server 6 determines whether or not both the identification information of the maintenance worker and the identification information of the maintenance supporter are transmitted to the server 6.

First identification information which is the identification information of the maintenance worker and second identification information which is the identification information of the maintenance supporter are stored in the server 6 in advance before the maintenance support system 100 is used. Specifically, for example, the maintenance supporter inputs the first identification information (for example, ID number) of the maintenance worker who is determined to use the maintenance support system 100 into the support terminal 2 by using the keyboard of the support terminal 2 or the like so that the input first identification information is transmitted to the server 6 via the telecommunication line N and is stored. Similarly, for example, the maintenance supporter inputs the second identification information (for example, ID number) of the maintenance supporter who is determined to use the maintenance support system 100 to the support terminal 2 by using the keyboard of the support terminal 2 or the like so that the input second identification information is transmitted to the server 6 through the telecommunication line N and is stored. Alternatively, a configuration may be such that the first identification information of the maintenance worker who may use the maintenance support system 100 and the second identification information of the maintenance supporter who may use the maintenance support system 100 are stored in advance in the support terminal 2 so that the maintenance supporter selects the first identification information of the maintenance worker who actually uses the maintenance support system 100 and the second identification information of the maintenance supporter who actually uses the maintenance support system 100, out of the first identification information and the second identification information stored in the support terminal 2 by using a keyboard or the like of the support terminal 2, and thereby the selected first identification information and the second identification information are transmitted to the server 6 through the telecommunication line N and are stored therein.

Note that in the present embodiment, when the first identification information and the second identification information are stored by the server 6, use-start times and usage times of the maintenance support system 100, which are used by the maintenance worker and the maintenance supporter, are also stored together in the server 6.

When the use-start time of the maintenance support system 100 comes or the use-start time approaches, identification information is transmitted from the communication device 34 of the wearable terminal 1 to the server 6. The identification information transmitted from the communication device 34 is, for example, the identification information of the wearable terminal 1 stored in advance in the control-signal processing device 3 of the wearable terminal 1. In this case, the wearable terminal 1 worn by the maintenance worker is determined in advance, and the identification information of the wearable terminal 1 is transmitted to the server 6 as the identification information (first identification information) of the maintenance worker. Similarly, when the use-start time of the maintenance support system 100 comes or the use-start time approaches, the identification information is transmitted from the support terminal 2 to the server 6. This identification information transmitted from the support terminal 2 is, for example, the second identification information of the maintenance supporter input by the maintenance supporter using the keyboard or the like of the support terminal 2. When the maintenance supporter who operates the support terminal 2 is determined in advance, the identification information of the support terminal 2 stored in advance in the support terminal 2 may be transmitted to the server 6 as the identification information of the maintenance supporter (the second identification information).

The server 6 determines whether or not the identification information transmitted from the communication device 34 to the server 6 as described above matches the first identification information stored in the server 6. Similarly, the server 6 determines whether or not the identification information transmitted from the support terminal 2 to the server 6 as described above matches the second identification information stored in the server 6. Then, when the identification information transmitted from the communication device 34 to the server 6 matches the first identification information, and the identification information transmitted from the support terminal 2 to the server 6 matches the second identification information (when it is authenticated that both the identification information of the maintenance worker who uses the maintenance support system 100 and the identification information of the maintenance supporter who uses the maintenance support system 100 have been transmitted to the server 6), the bidirectional data communication between the communication device 34 and the support terminal 2 via the server 6 is enabled until the usage time elapses from the use-start time.

As described above, in the maintenance support system 100 according to the present embodiment, only when it is authenticated that both the identification information of the maintenance worker and the identification information of the maintenance supporter have been transmitted to the server 6, bidirectional data communication between the communication device 34 and the support terminal 2 is enabled. Therefore, only the maintenance worker and the maintenance supporter, who are determined in advance, are allowed to use the maintenance support system 100, and therefore it is possible to prevent leakage of the confidential information, etc. excluding the maintenance target T more reliably.

Note that the configuration may be such that bidirectional transmission/reception of voice data is enabled at the time when bidirectional data communication between the communication device 34 and the support terminal 2 is enabled as described above, and the transmitted/received voice data is stored in the server 6 and/or the support terminal 2. By storing the voice data, it is possible to reliably save the history of maintenance support.

Further, in the case where at least one of the maintenance worker and the maintenance supporter stops or interrupts the use of the maintenance support system 100 before the usage time elapses, the configuration may be made such that predetermined instruction information that indicates stopping or interruption of the use is transmitted from the communication device 34 of the wearable terminal 1 and/or the support terminal 2 to the server 6 so that the server 6 stops or interrupts the bidirectional data communication between the communication device 34 and the support terminal 2.

Furthermore, when there are a plurality of wearable terminals 1 or when there are a plurality of support terminals 2, it may be configured to adopt a mode in which all the bidirectional data communication in each terminal 1 and 2 is enabled only when all the identification information transmitted from each terminal 1 and 2 is authenticated by the server 6, or to adopt a mode in which only the bidirectional data communication in each authenticated terminal 1 and 2 is enabled.

Figure 2:
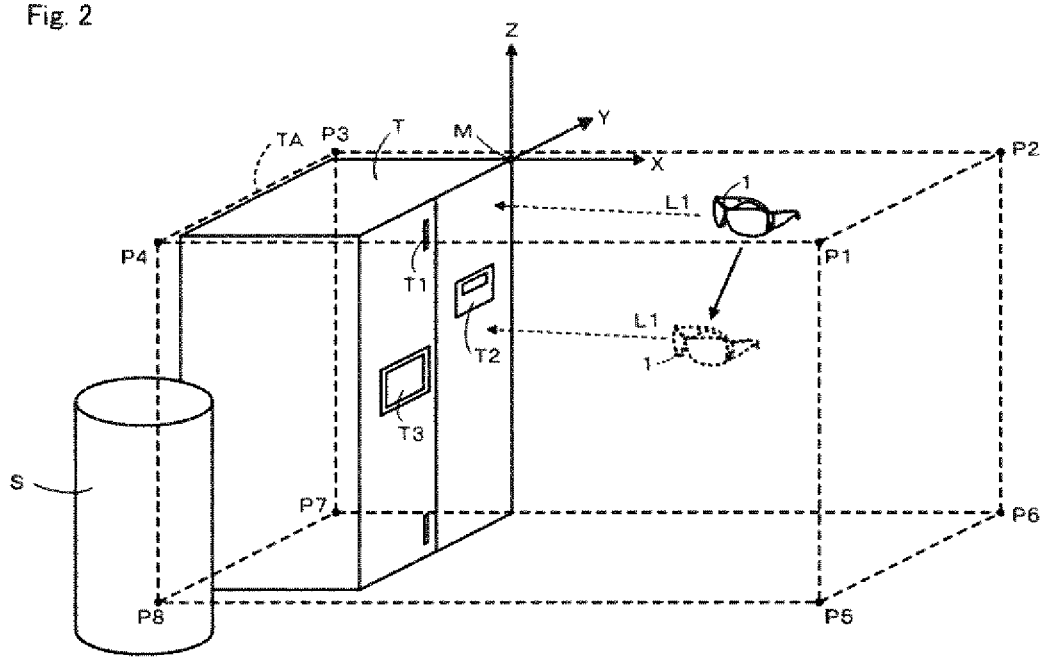
FIG. 2 is an explanatory diagram to illustrate outline operation of the maintenance support system shown in FIG. 1.
Figure 3A:
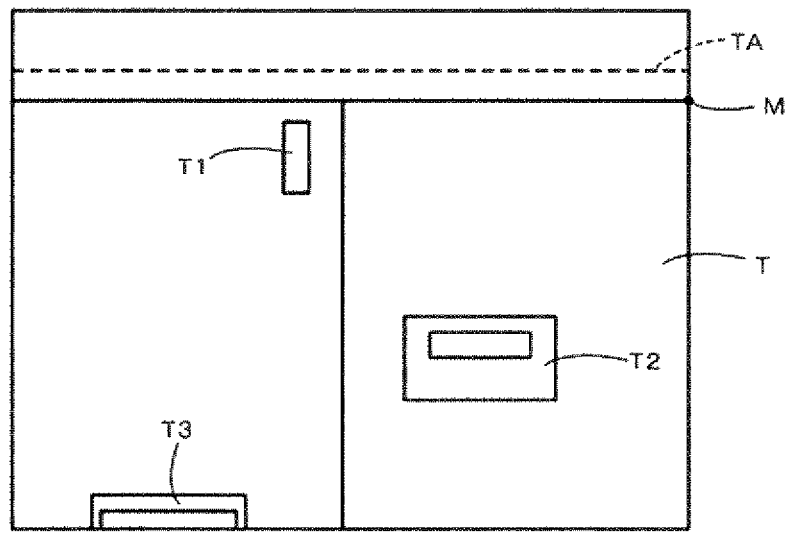
FIG. 3 (FIGS. 3A and 3B) is a diagram to show an example of a captured image acquired by the imaging device in the initial state shown in FIG. 1 and an example of a processed image generated by the processed-image generating device.
Figure 3B:
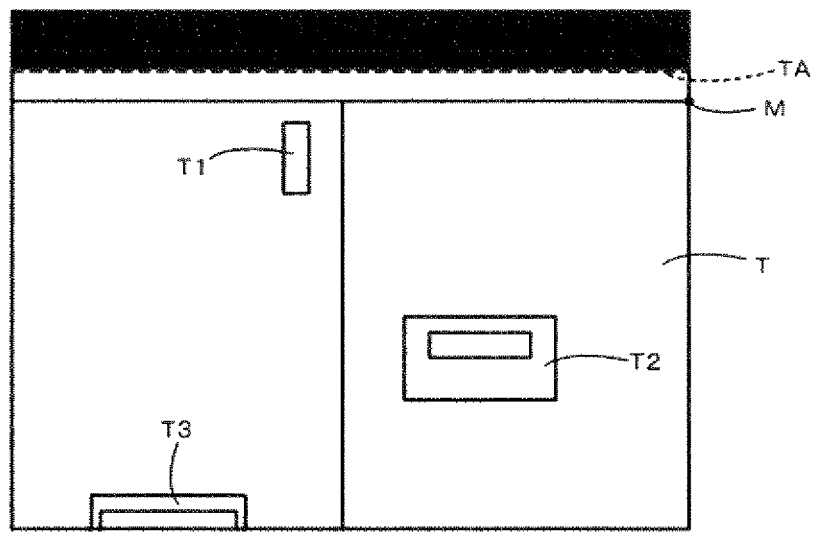
Figure 4A:
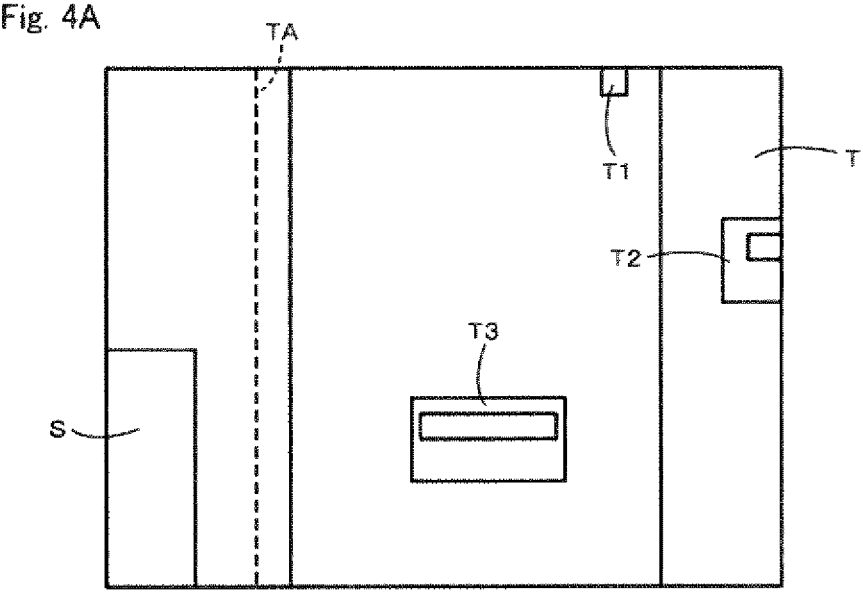
FIG. 4 (FIGS. 4A and 4B) is a diagram to show an example of a captured image acquired by the imaging device in the post-movement state in which the wearable terminal shown in FIG. 1 has moved, and an example of a processed image generated by the processed-image generating device.
Figure 4B:
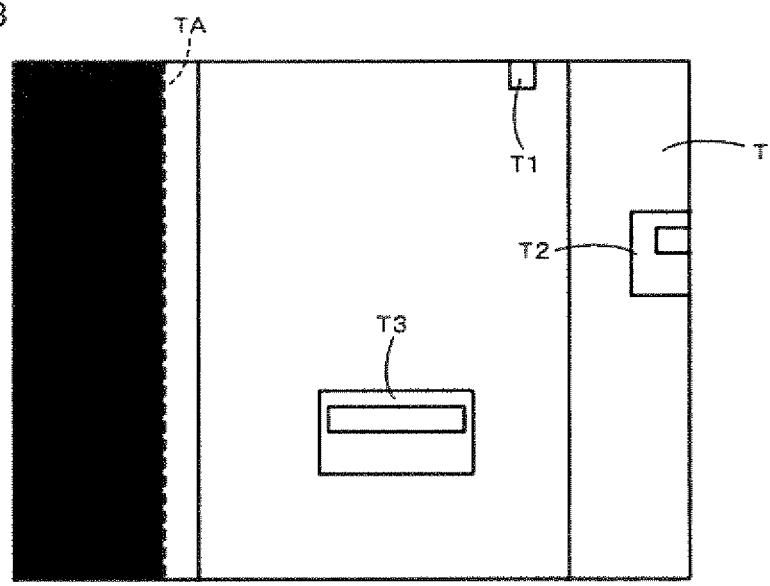

FIG. 2 is an explanatory diagram to illustrate outline operation of the maintenance support system 100 according to the present embodiment. In FIG. 2, the maintenance worker wearing the wearable terminal 1 is not shown. FIG. 3 is a diagram to show an example of a captured image acquired by the imaging device 12 in the initial state and an example of processed image generated by the processed-image generating device 33. FIG. 3A shows an example of the captured image, and FIG. 3B shows an example of the processed image. FIG. 4 is a diagram to show an example of a captured image acquired by the imaging device 12 in the post-movement state in which the wearable terminal 1 has moved, and an example of a processed image generated by the processed-image generating device 33. FIG. 4A shows an example of the captured image, and FIG. 4B shows an example of the processed image. Note that, in FIG. 3 and FIG. 4, a boundary line of a first three-dimensional area TA is illustrated by a broken line for convenience of explanation, but the boundary line does not exist in an actual captured image.

As shown in FIG. 2, members T1 to T3 are provided on the front side of the maintenance target T of the present embodiment. Next to the maintenance target T, an apparatus S related to confidential information is disposed.

First, the maintenance worker wearing the wearable terminal 1, for example, moves to a position directly facing the maintenance target T so as to be able to capture an image of the maintenance target T with the imaging device 12 of the wearable terminal 1. Then, the maintenance worker captures an image of the maintenance target T with this imaging device 12 in the initial state (the imaging device 12 included in the wearable terminal 1 shown by a solid line in FIG. 2) to acquire the captured image (video image) as shown in FIG. 3A.

Next, for example, the maintenance worker designates an arbitrary point on a captured image displayed on the display 13 by using an AR cursor, and thereby the first identifying device 31 identifies the above-described designated point as a reference point M and stores it in the first identifying device 31. Further, it is also possible that the first identifying device 31 performs predetermined image processing on a captured image, and thereby extracts a pixel area corresponding to a characteristic portion (for example, a corner portion, etc., of the maintenance target T) in the captured image to identify and store a center, etc., of this pixel area as the reference point M. Further, when a marker is attached to the maintenance target T (a marker such as an AR marker, a QR code (registered trademark), and a bar code is attached by bonding, printing, imprinting, etc.), it is also possible that the first identifying device 31 performs predetermined image processing on a captured image and thereby extracts a pixel area corresponding to the marker and identifies a center, etc., of the pixel area as the reference point M.

Then, in the present embodiment, the first identifying device 31 identifies a predetermined first three-dimensional area (for example, a rectangular parallelepiped three-dimensional area) TA including the maintenance target T with reference to the reference point M. The first three-dimensional area TA is a three-dimensional area in a virtual space. The coordinates of each vertex P1 to P8 of the first three-dimensional area TA represented by three-dimensional coordinate system with reference to the reference point M (the three-dimensional coordinate system having X, Y, and Z axes shown in FIG. 2) are stored in advance in the first identifying device 31, and the first identifying device 31 uses, for example, the SLAM technique to identify the first three-dimensional area TA based on the coordinates of each of these vertices P1 to P8.

Moreover, it is also possible that the maintenance worker designates each vertex P1 to P8 of the first three-dimensional area TA by using an AR cursor on a captured image displayed on the display 13, and thereby the first identifying device 31 identifies the first three-dimensional area TA by using, for example, the SLAM technique. In this case, since each vertex P1 to P8 of the first three-dimensional area TA is disposed in the three-dimensional coordinate system with reference to the reference point M in an instance that it is designated by use of the AR cursor, the coordinates of each vertex P1 to P8 are determined and as a result, the first three-dimensional area TA can be identified.

Further, when a marker is attached to the maintenance target T, it is also possible that the first identifying device 31 calculates a characteristic quantity of the pixel area corresponding to the marker to identify identification information of the marker from the characteristic quantity, and identifies the first three-dimensional area TA by using, for example, the SLAM technique based on the coordinates of each vertex P1 to P8 stored in association with the identified identification information in the first identifying device 31. When, in this way, the reference point M is defined by a marker, since coordinates of each vertex P1 to P8 have been already stored in the first identifying device 31, the maintenance worker does not need to set them so that not much effort will be required. When the shape of the maintenance target T is complicated, it is possible to accurately set each vertex P1 to P8 (or, vertices of more than eight) based on the design drawing of the maintenance target T in advance so as to be associated with the identification information of the marker, which is particularly effective.

Note that FIG. 2 exemplifies a case in which the wearable terminal 1 worn by the maintenance worker moves within the first three-dimensional area TA.

Next, as the maintenance worker wearing the wearable terminal 1 moves, the wearable terminal 1 moves as well, and in a post-movement state in which the wearable terminal 1 has moved, an image of the maintenance target T is captured with the imaging device 12 included in the wearable terminal 1 (the imaging device 12 included in the wearable terminal 1 illustrated by a broken line in FIG. 2) to acquire a captured image as shown in FIG. 4A. This captured image does not include a reference point M.

Then, in the above-described moving process, captured images are continuously acquired by the imaging device 12 and the second imaging devices 32a and 32b. Moreover, range images are continuously acquired by the range image sensor 32c. Further, acceleration, angular velocity, and geomagnetism (azimuth) of the imaging device 12 included in the wearable terminal 1 are continuously detected by an inertial sensor 32d.

The second identifying device 32 identifies a mask pixel area excluding an effective pixel area corresponding to the first three-dimensional area TA in a captured image acquired by the imaging device 12 in a post-movement state in which the wearable terminal 1 has moved.

Specifically, when the second imaging devices 32a and 32b constitute the second identifying device 32, based on the captured image continuously acquired by the second imaging devices 32a and 32b in the moving process, a software portion 32e constituting the second identifying device 32 constructs an environmental map of the self-position and the surroundings of the wearable terminal 1 (the imaging device 12), and thereby identifies the first three-dimensional area TA in a captured image in the post-movement state.

Moreover, when the range image sensor 32c constitutes the second identifying device 32, based on the range image continuously acquired by the range image sensor 32c in the moving process, the software portion 32e constituting the second identifying device 32 identifies the first three-dimensional area TA in a captured image in the post-movement state by using, for example, the SLAM technique.

Further, the same applies to a case in which the imaging device 12 and the inertial sensor 32d constitute the second identifying device 32. Moreover, there is a conceivable case in which any of the second imaging devices 32a and 32b, the range image sensor 32c, the imaging device 12 and the inertial sensor 32d are combined to constitute the second identifying device 32, and in such a case, the second identifying device 32 identifies the first three-dimensional area TA in the captured image in the post-movement state by using, for example, the SLAM technique.

Note that the second identifying device 32 of the present embodiment does not use GPS in identifying the first three-dimensional area TA in a captured image in the post-movement state (as described later, the same applies to a case of identifying the second three-dimensional area SA in a captured image in the post-movement state). This is because of that the GPS cannot be used indoor, and that position detection error of at least several meters occurs.

The second identifying device 32 identifies, as described above, the first three-dimensional area TA in a captured image in the post-movement state, and thereby identifies the mask pixel area excluding the effective pixel area corresponding to the first three-dimensional area TA. It is possible by geometric calculation to identify which portion the first three-dimensional area TA is reflected within the field of view of the imaging device 12 in the post-movement state, in other words, which pixel area it corresponds to in a captured image acquired by the imaging device 12. Accordingly, it is possible to identify an effective pixel area corresponding to the first three-dimensional area TA and to identify a mask pixel area excluding the effective pixel area.

Next, the processed-image generating device 33 generates a processed image (video image) in which the mask pixel area identified by the second identifying device 32 is made invisible for the captured image acquired by the imaging device 12 in the post-movement state. In an example shown in FIG. 4B, an image in which a mask pixel area is dark filled is generated as a processed image. However, the processed image may be, without being limited to this, an image in which only the effective pixel area (only pixel area excluding the mask pixel area) is cut out from the captured image. Moreover, instead of dark filling the mask pixel area, various modes may be adopted as long as leakage of confidential information can be prevented such as by making the area mosaicked and fogged.

Finally, the communication device 34 transmits a processed image generated by the processed-image generating device 33 to the support terminal 2 through a telecommunication line N. Therefore, as shown in FIG. 4A, even if an apparatus S related to confidential information is visible in a captured image, on the support terminal 2, as shown in FIG. 4B, only the maintenance target T included in the first three-dimensional area TA is visually recognized, and thus it is possible to prevent leakage of confidential information, etc. excluding maintenance target T.

Note that the second identifying device 32, the processed-image generating device 33, and the communication device 34 operate on a captured image acquired by the imaging device 12 in the initial state as shown in FIG. 3A. Thereby, in the processed-image generating device 33, a processed image as shown in FIG. 3B in which the mask pixel area is made invisible will be generated even for a captured image acquired by the imaging device in the initial state and transmitted to the support terminal 2.

Note that the second imaging devices 32a and 32b or the like which constitute the second identifying device 32 fails or causes any trouble, it becomes not possible to correctly identify the change in the position of the imaging device 12 in the post-movement state from the initial state. Accordingly, it becomes not possible to correctly identify an effective pixel area corresponding to the first three-dimensional area TA in a captured image acquired by the imaging device 12 in the post-movement state. Consequently, there arises possibility that a generated processed image includes confidential information etc. excluding the maintenance target T.

Therefore, it is preferable that the processed-image generating device 33 has a function of generating a processed image in which all the pixel areas are made invisible, or the communication device 34 has a function of stopping transmission of the processed image, when the second imaging devices 32a and 32b or the like fails or causes any trouble. Further, at this time, it is preferable that the fact that failure or some trouble has occurred is displayed on the display 13, or the fact that failure or some trouble has occurred is notified by voice to the speaker 4 so that the maintenance worker can promptly know that failure or some trouble has occurred in the second imaging devices 32a and 32b or the like.

The display 13 of the present embodiment is configured to be switchable between a state in which a captured image is displayed on the display 13 (specifically, in the present embodiment, a state in which the maintenance worker can directly visually recognize the maintenance target T through the transmission-type display 13 on which nothing is displayed) and a state in which a processed image is displayed on the display 13 in a recognizable manner. Specifically, for example, it is possible to adopt a mode in which a switching button (not shown) is provided on the frame 11 and the control-signal processing device 3 controls to select either one of the states by pressing the switching button.

In a state in which a captured image is displayed on the display 13 (a state in which the maintenance worker can directly visually recognize the maintenance target T), since there is no portion that obstructs the field of view of the maintenance worker, maintenance work can be performed safely.

On the other hand, in a state in which a processed image is displayed on the display 13 in a recognizable manner, the maintenance worker can also recognize the processed image transmitted to the support terminal 2. Therefore, the maintenance worker can also confirm that leakage of the confidential information, etc. excluding the maintenance target T is prevented, which gives a sense of relief to the maintenance worker. Note that examples of the state in which processed image is displayed in a recognizable manner include, a state in which the same thing (an image in which although reflected area is the same as a captured image, the mask pixel area in a captured image is dark filled, an image obtained by cutting out only an effective pixel area from a captured image, and the like) as the processed image transmitted to the support terminal 2 is displayed, as well as a state in which an image obtained by overlaying a boundary line between the mask pixel area and the effective pixel area (boundary line of the first three-dimensional area TA) on the captured image is displayed as shown in FIGS. 3A and 4A, and a state in which a processed image is reduced in size and displayed on a portion of the display screen.

Note that in the present embodiment, although description has been made on a case as an example in which one first three-dimensional area TA is identified for one maintenance target T, the present invention will not be limited to this. For example, when there are a plurality of maintenance targets T, a reference point M may be set for each maintenance target T and the first three-dimensional area TA may be identified for each maintenance target T. For example, when the one maintenance target T is a substrate processing apparatus, and parts of the substrate processing apparatus are removed and repair work etc., is performed on a predetermined work desk, another maintenance target T is set to this work desk, and the reference point M may be set on the work desk as well.

Further, in the present embodiment, as the first three-dimensional area TA, a three-dimensional area having a rectangular parallelepiped shape having eight vertices P1 to P8 has been described as an example, but the present invention is not limited to this. Depending on the shape of the maintenance target T, it is also possible to set the first three-dimensional area TA having a shape other than the rectangular parallelepiped, which is identified by more than eight points.

Further, in the present embodiment, a case in which one wearable terminal 1 is electrically connected to the support terminal 2 has been described as an example, but the present invention will not be limited to this. It is also possible to adopt a configuration in which a plurality of wearable terminals 1 are electrically connected to the support terminal 2.

In this case, the configuration may be such that the imaging device 12 of the plurality of wearable terminals 1 identify the same first three-dimensional area TA with reference to the same reference point M, or it is also possible to adopt a configuration in which a different reference point M is used, or a different first three-dimensional area TA is identified for each wearable terminal 1.

Further, the support terminal 2 can adopt various modes such as one in which the processed images transmitted from the plurality of wearable terminals 1 are displayed side by side at the same time, or the processed image to be displayed is switchable.

Furthermore, it is possible to prepare a plurality of support terminals 2 electrically connected to the wearable terminal 1, regardless of whether the wearable terminal 1 is singular or plural.

Further, in the present embodiment, although the area including the maintenance target T and also including the range in which the wearable terminal 1 moves is set as the first three-dimensional area TA as shown in FIG. 2, the present invention will not be limited to this. For an area in which non-existence of an apparatus S related to confidential information is determined in advance even if it is an area in which the maintenance target T does not exist or an area in which the wearable terminal 1 does not move, it is also possible to further widen the first three-dimensional area TA so as to include such area. Further, the first three-dimensional area TA is not limited to one continuous area, and a plurality of separated areas can be set as the first three-dimensional area TA.

Second Embodiment

A maintenance support system according to a second embodiment has a similar outline configuration to that of the maintenance support system 100 according to the first embodiment which has been described with reference to FIG. 1.

However, the maintenance support system according to the second embodiment is different in the setting of the first three-dimensional area TA from the maintenance support system 100 according to the first embodiment. Hereinafter, description will be made on this point.

Figure 5:
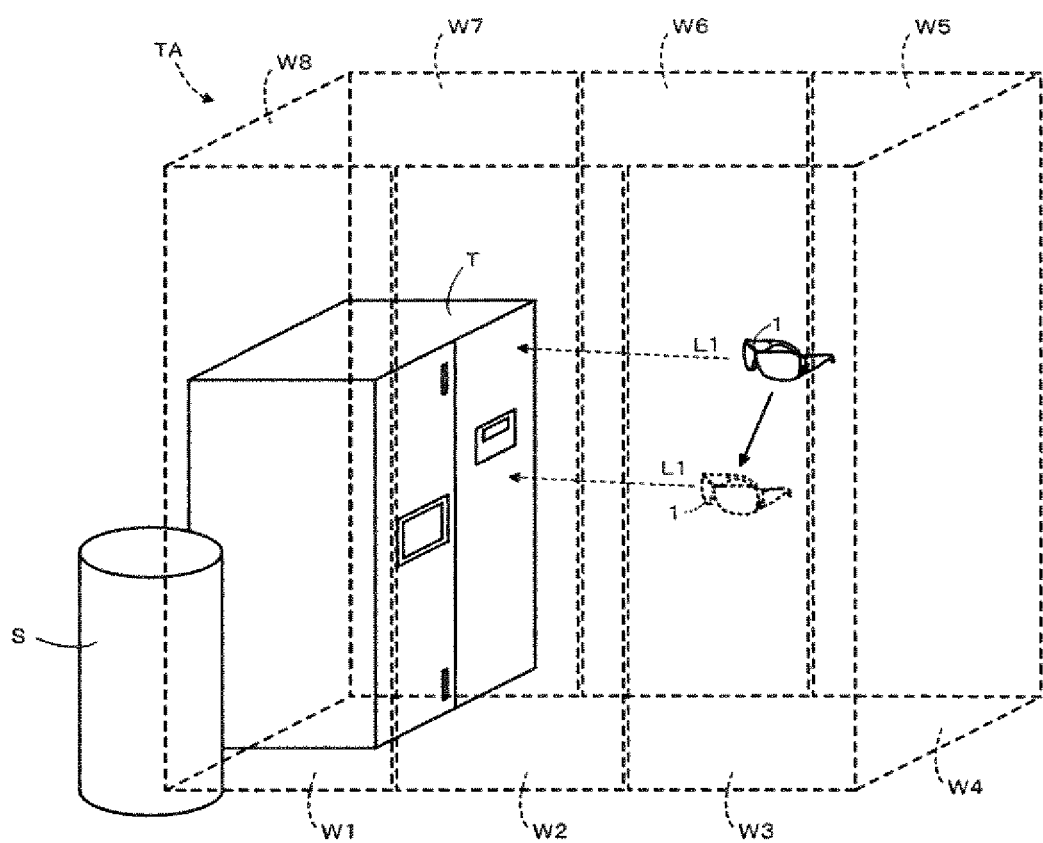
FIG. 5 is an explanatory diagram to illustrate a setting example of a first three-dimensional area in a maintenance support system according to a second embodiment of the present invention.

FIG. 5 is an explanatory diagram to illustrate a setting example of the first three-dimensional area TA in the maintenance support system according to the second embodiment.

As shown in FIG. 5, in the present embodiment, the first three-dimensional area TA consists of a plurality (eight in the example shown in FIG. 5) of virtual partition walls W1 to W8. In the example shown in FIG. 5, an area surrounded by the eight partition walls W1 to W8 is set as the first three-dimensional area TA. The partition walls W1 to W8 may be designated by the maintenance worker using an AR cursor for the captured image displayed on the display 13. As a result, the first identifying device 31 identifies the area surrounded by the partition walls W1 to W8 as the first three-dimensional area TA.

The partition walls as shown in FIG. 5 are preferably configured such that the position, size, and number thereof can be designated freely by the maintenance worker. According to this preferable configuration, even if the shape or the size of the maintenance target T changes, the position, size, and number of the partition wall may be freely changed, and therefore, such configuration provides versatility, as well as makes it easier to identify the mask pixel area by the second identifying device 32. Further, for example, when the maintenance target T includes not only a main body of the substrate processing apparatus but also an auxiliary apparatus (for example, a pump or a chiller) located at a place slightly apart from the main body of the substrate processing apparatus, it is possible to more appropriately arrange partition walls to configure the first three-dimensional area TA as compared to the first three-dimensional area TA of a constant size as shown in FIG. 2 (the layout can be easily changed).

Note that a small gap may exist between the partition walls as long as the apparatus S related to confidential information cannot be visually recognized on the support terminal 2 (that is, invisible in the processed image). FIG. 5 illustrates an example in which some gaps exist between the partition walls W1 and W2, between the partition walls W2 and W3, between the partition walls W5 and W6, and between the partition walls W6 and W7. However, in order to ensure that the apparatus S related to confidential information cannot be visually recognized on the support terminal 2, it is preferable that each partition wall has a portion overlapping with each other as seen from the imaging direction (line-of-sight direction) L1 of the imaging device 12 of the wearable terminal 1 within the first three-dimensional area TA.

Further, in the example shown in FIG. 5, no partition wall is provided in the ceiling portion or the floor portion of the place where the maintenance target T is located, but the partition walls may be set freely as long as the apparatus S related to confidential information around the maintenance target T is not visible on the support terminal 2.

Third Embodiment

A maintenance support system according to a third embodiment also has the same outline configuration as that of the maintenance support system 100 according to the first embodiment described with reference to FIG. 1.

However, the maintenance support system according to the third embodiment is different from the maintenance support system 100 according to the first embodiment in that a second three-dimensional area SA is used instead of the first three-dimensional area TA. Hereinafter, this point will be described.

Figure 6:
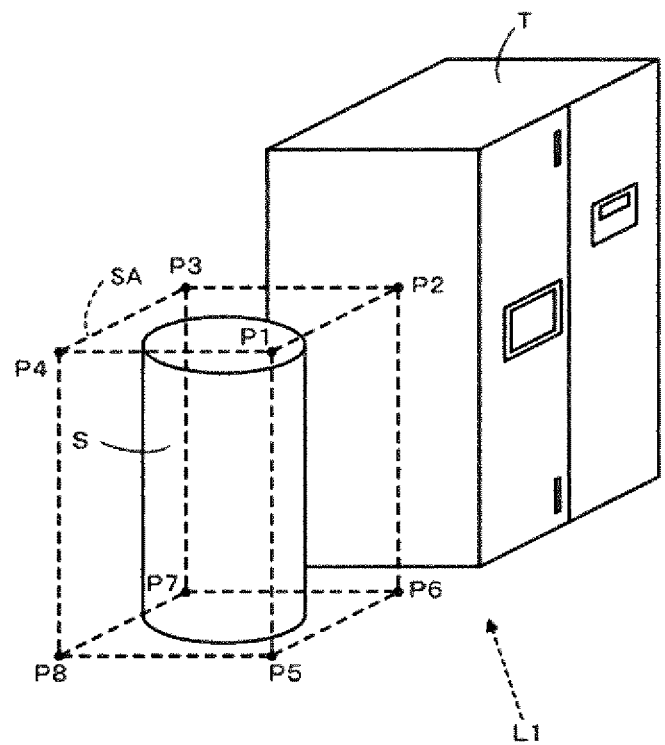
FIG. 6 is an explanatory diagram to illustrate a second three-dimensional area to be used in a maintenance support system according to a third embodiment of the present invention.

The maintenance support system according to the third embodiment is configured such that the first identifying device 31 identifies a predetermined second three-dimensional area excluding the maintenance target T with reference to the reference point M (for example, identifies the second three-dimensional area SA including the apparatus S related to confidential information as shown in FIG. 6), and the second identifying device 32 identifies a mask pixel area corresponding to the second three-dimensional area SA. The second three-dimensional area SA is a three-dimensional area in a virtual space. In the case of identifying the second three-dimensional area SA as well, the contents of description on the case of identifying the first three-dimensional area TA described above can be similarly applied.

The first identifying device 31 may identify the second three-dimensional area SA instead of identifying the first three-dimensional area TA, or identifying both the first three-dimensional area TA and the second three-dimensional area SA. When the first identifying device 31 identifies the second three-dimensional area SA instead of identifying the first three-dimensional area TA, the second identifying device 32 will identify a mask pixel area corresponding to the second three-dimensional area SA. When the first identifying device 31 identifies both the first three-dimensional area TA and the second three-dimensional area SA, the second identifying device 32 identifies a mask pixel area excluding an effective pixel area corresponding to the first three-dimensional area TA, and identifies a mask pixel area corresponding to the second three-dimensional area SA. Note that when the both areas are identified, the mask pixel area excluding the effective pixel area corresponding to the first three-dimensional area TA and the mask pixel area corresponding to the second three-dimensional area SA may overlap. In this case, a pixel area which is identified as a mask pixel area at least in one area may be identified as the mask pixel area.

Fourth Embodiment

A maintenance support system according to a fourth embodiment also has the same outline configuration as that of the maintenance support system 100 according to the first embodiment described with reference to FIG. 1.

However, the maintenance support system according to the fourth embodiment differs from the maintenance support system 100 according to the first embodiment and the maintenance support system according to the second embodiment in the setting of the first three-dimensional area TA. Hereinafter, this point will be described. In the following description, a case in which there are two apparatuses (apparatuses S1 and S2) related to confidential information will be exemplified.

Figure 7A:
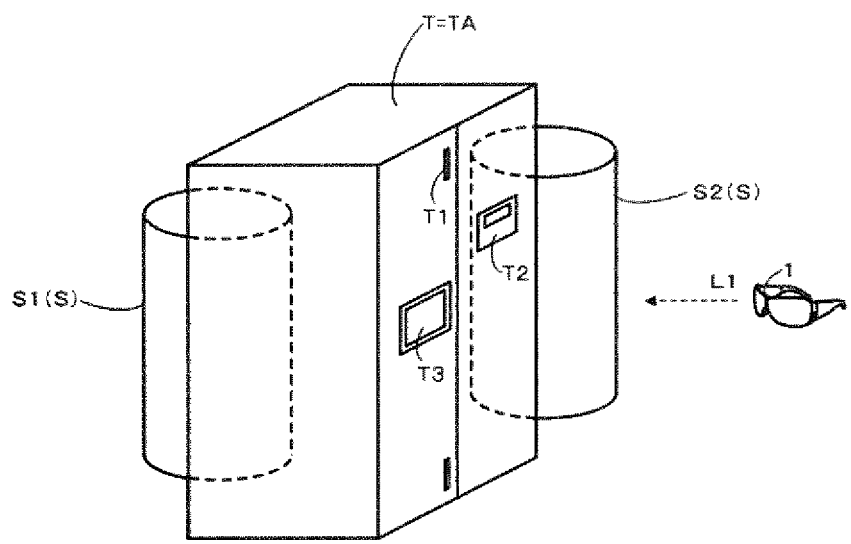
FIG. 7 (FIGS. 7A and 7B) is an explanatory diagram to illustrate a setting example of a first three-dimensional area and outline operation of the second identifying device at this time in a maintenance support system according to a fourth embodiment of the present invention.
Figure 7B:
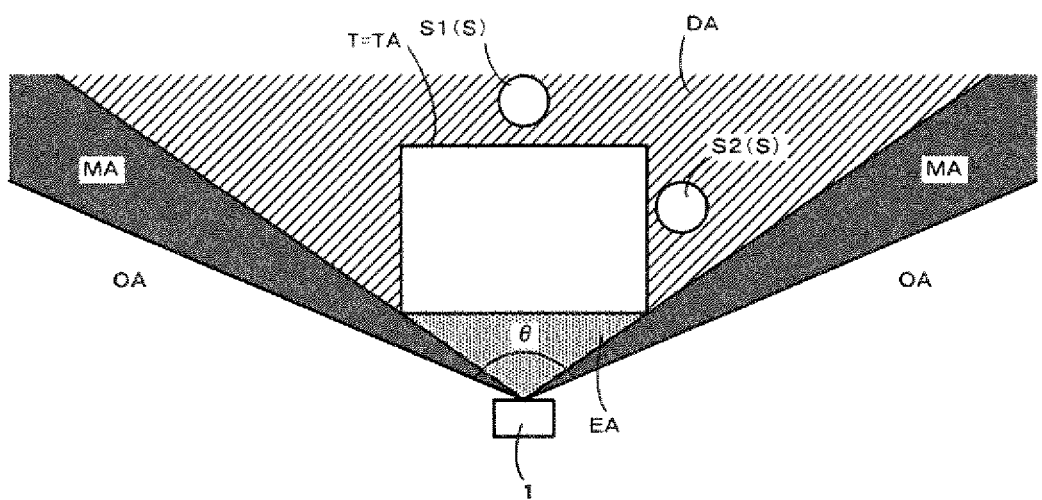

FIG. 7 is an explanatory diagram to illustrate a setting example of the first three-dimensional area TA and an outline operation of the second identifying device 32 at this time in the maintenance support system according to the fourth embodiment. FIG. 7A is a perspective view to show a setting example of the first three-dimensional area TA. FIG. 7B is a plan view to illustrate the outline operation of the second identifying device 32, and to show a state in which the wearable terminal 1 is located at a position directly facing the middle of the front side (the side on which the members T1 to T3 shown in FIG. 7A are provided) of the maintenance target T (the imaging direction L1 of the imaging device 12 of the wearable terminal 1 shown in FIG. 7A is orthogonal to the front side of the maintenance target T).

Figure 8A:
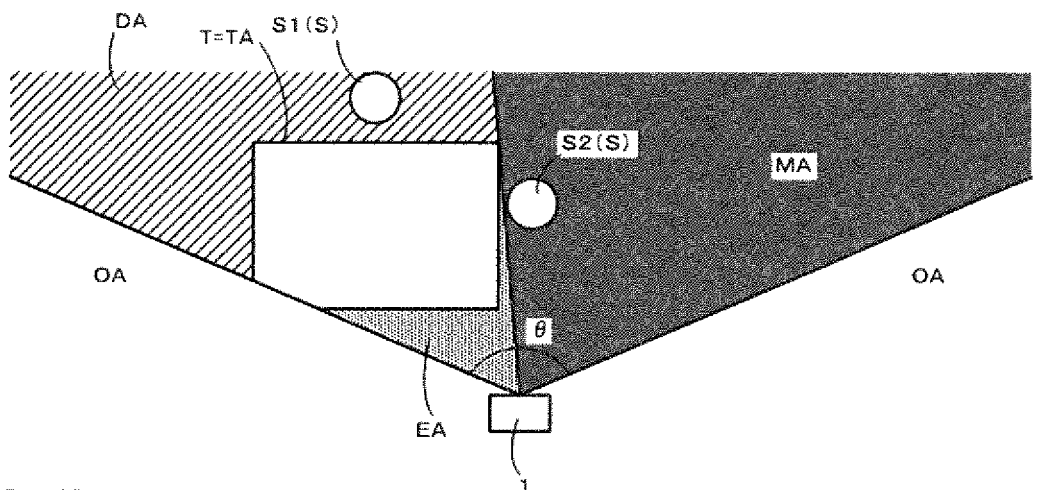
FIG. 8 (FIGS. 8A to 8C) is a plan view to illustrate outline operation of the second identifying device when the first three-dimensional area is set as shown in FIG. 7.
Figure 8B:
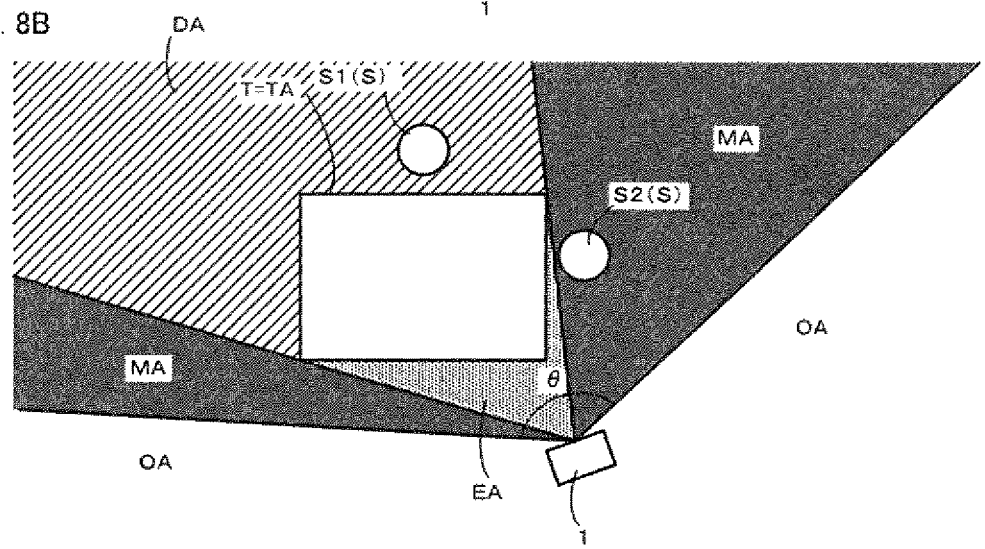
Figure 8C:
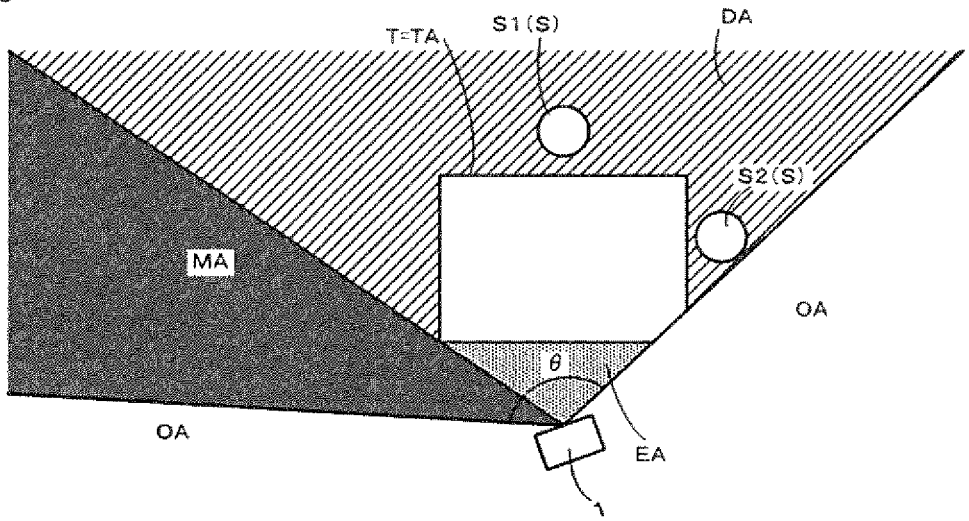

FIG. 8 is a plan view to illustrate an outline operation of the second identifying device 32 when the first three-dimensional area TA is set as shown in FIG. 7. FIG. 8A shows a state in which the wearable terminal 1 is in a position moved in parallel from the state shown in FIG. 7B to the apparatus S2 side. FIG. 8B shows a state in which the wearable terminal 1 is in a position rotationally moved (moved around the maintenance target T in a counterclockwise direction) from the state shown in FIG. 7B to the apparatus S2 side. FIG. 8C shows a state in which the wearable terminal 1 turned to the left on the spot from the state shown in FIG. 7B.

Note that, in FIG. 7B and FIG. 8, the wearable terminal 1 is illustrated as a rectangle for convenience.

In the example shown in FIG. 2 described above, an area including the maintenance target T and also including a range in which the wearable terminal 1 moves is set as the first three-dimensional area TA, but in the example shown in FIG. 7A, the first three-dimensional area TA is set so as to match the maintenance target T and the wearable terminal 1 moves outside the first three-dimensional area TA.

In a state in which the wearable terminal 1 is located at a position directly facing the middle of the front side of the maintenance target T as shown in FIG. 7B, when an image of the maintenance target T (first three-dimensional area TA) is captured by the imaging device of the wearable terminal 1, an object located in a range of the angle of view θ of the imaging device of the wearable terminal 1 forms an image and is acquired as a captured image. In other words, an object located in an outside area of imaging OA, which is outside of a range of the angle of view θ of the imaging device of the wearable terminal 1 shown in FIG. 7B, will not constitute a captured image.

The second identifying device 32 identifies a mask pixel area excluding an effective pixel area corresponding to the first three-dimensional area TA in an acquired captured image. Specifically, the second identifying device 32 identifies, in the captured image, a pixel area obtained as a result of an object, which is located in the mask area MA shown in FIG. 7B, forming an image, or a pixel area obtained as a result of an object forming an image through the mask area MA, as the mask pixel area.

An object located in a dead angle area DA, which is located behind the first three-dimensional area TA (maintenance target T) as seen from the imaging device of the wearable terminal 1, is blocked by the maintenance target T and does not form an image, and therefore will not constitute a captured image. This results in the same effect as in the case of identifying a pixel area excluding an effective pixel area corresponding to the first three-dimensional area TA, as the mask pixel area.

Moreover, when an image of the first three-dimensional area TA (maintenance target T) is captured by the imaging device of the wearable terminal 1, an area which is present between the wearable terminal 1 and the first three-dimensional area TA, and is also present within a range of angle of view θ of the imaging device is originally an area other than the first three-dimensional area TA, but the second identifying device 32 identifies this area as an exception area EA located in front of the first three-dimensional area TA. Then, the second identifying device 32 identifies a pixel area, which is obtained as a result of an object forming an image through this exception area EA, as an effective pixel area, in a captured image. Since the pixel area obtained by image forming through the exception area EA (that is, a pixel area corresponding to the front side of the maintenance target T) is an effective pixel area, the processed-image generating device 33 will not make it invisible. In other words, in the processing, priority is given to visual recognizability of the first three-dimensional area TA (maintenance target T).

As shown in FIG. 8A, when the wearable terminal 1 is moved in parallel from a state shown in FIG. 7B to the apparatus S2 side (when the maintenance worker wearing the wearable terminal 1 moves to the right side while looking at the maintenance target T from the front), the position of the exception area EA greatly changes compared to the state shown in FIG. 7B. In the example shown in FIG. 8A, since the apparatus S2 is located in the mask area MA, the second identifying device 32 identifies the pixel area obtained by image forming of the apparatus S2 in the captured image as the mask pixel area, and the processed-image generating device 33 makes this mask pixel area invisible so that the apparatus S2 will not be reflected in the processed image. However, depending on the position of the wearable terminal 1, the apparatus S2 may fall within the exception area EA. In such a case, it is also possible to separately set the above-described second three-dimensional area SA.

As shown in FIG. 8B, when the wearable terminal 1 moves by rotation to the apparatus S2 side from the state shown in FIG. 7B (when the maintenance worker wearing the wearable terminal 1 moves around the maintenance target T counterclockwisely) as well, the apparatuses S2 and S1 may fall within the exception area EA as in the case of FIG. 8A. As described before, it is possible to cope with such case by separately setting a second three-dimensional area SA.

As shown in FIG. 8C, when the wearable terminal 1 changes its orientation to the left on the spot from the state shown in FIG. 7B (the maintenance worker wearing the wearable terminal 1 changes its viewing direction (orientation of its head) to the left direction on the spot), if, as shown in FIG. 7B, the apparatus S1 or S2 is originally located within the dead angle area DA, it will remain to be located within the dead angle area DA even if the line-of-sight direction is changed.

As in the maintenance support system according to the fourth embodiment described with reference to FIGS. 7 and 8, when a first three-dimensional area TA is set so as to match the maintenance target T, and the wearable terminal 1 moves outside the first three-dimensional area TA, it is necessary to separately set the second three-dimensional area SA in preparation for the possibility that the apparatus S (S1 and S2) related to confidential information is located in an exception area EA: however, as in the case shown in FIG. 2 described above, on the support terminal 2, only the first three-dimensional area TA (maintenance target T) is visually recognized, and it is possible to prevent leakage of confidential information, etc. excluding the maintenance target T.

Figure 9A:
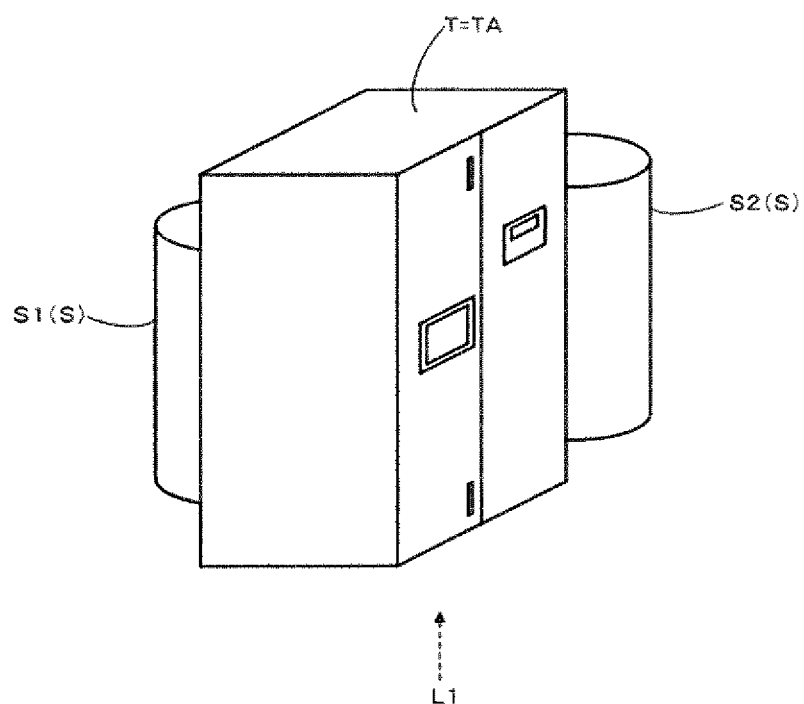
FIG. 9 (FIGS. 9A and 9B) is a diagram to show an example of a processed image which is generated by the processed-image generating device when a first three-dimensional area is set, and also a second three-dimensional area is set as shown in FIG. 7.
Figure 9B:
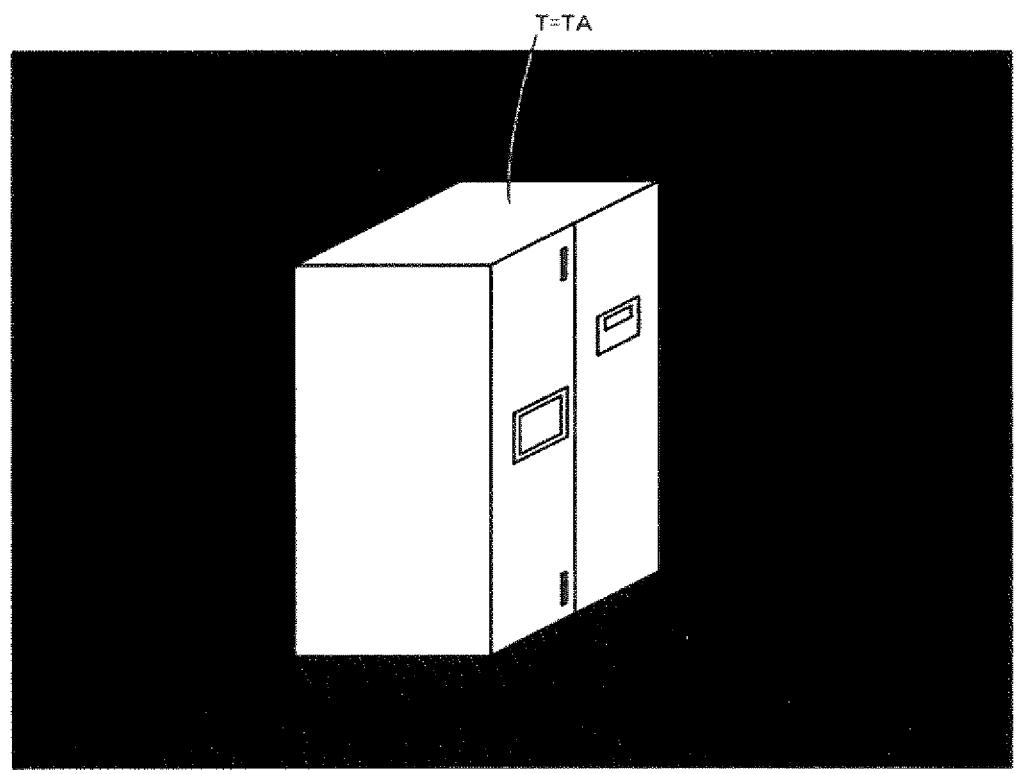
Figure 10:
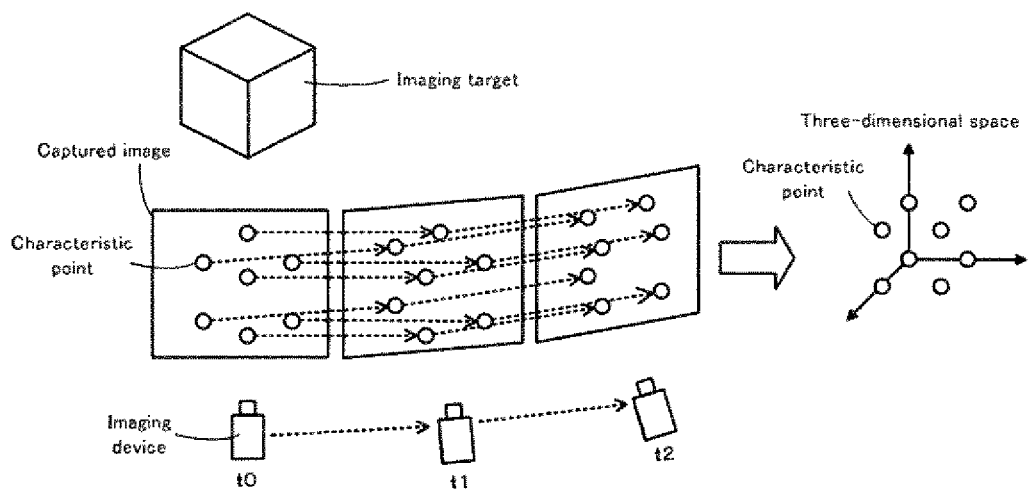
FIG. 10 is an explanatory diagram to illustrate an outline of the SLAM technique.

FIG. 9 is a diagram to show an example of the processed image which is generated by the processed-image generating device 33 when the first three-dimensional area TA is set as shown in FIG. 7, as well as the second three-dimensional area SA is set. FIG. 9A is a diagram to illustrate the imaging direction (line-of-sight direction) L1 of the imaging device 12 of the wearable terminal 1, and FIG. 9B is a diagram to show an example of the processed image which is generated at the time of the imaging direction L1 shown in FIG. 9A. Note that in FIG. 9A, illustration of the wearable terminal 1 is omitted.

As shown in FIG. 9B, a processed image in which the mask pixel area excluding the effective pixel area corresponding to the predetermined first three-dimensional area TA including the maintenance target T (the maintenance target T=the first three-dimensional area TA), and the mask pixel area corresponding to the second three-dimensional area SA (not shown) respectively set for the apparatuses S1 and S2 shown in FIG. 9A are made invisible (dark filled in the case shown in FIG. 9) in the captured image acquired by the imaging device 12 included in the wearable terminal 1 worn by the maintenance worker.

Note that in the viewpoint of layout, when an apparatus S related to confidential information is not present in the vicinity of the maintenance target T (that is, there is no apparatus S related to confidential information between the area in which the worker wearing the wearable terminal 1 moves and the maintenance target T), setting of the first three-dimensional area TA will be satisfactory, and setting of the second three-dimensional area SA will be needed when an apparatus S related to confidential information is present in the vicinity of the maintenance target T.

REFERENCE SIGNS LIST

1 Wearable terminal
2 Support terminal
3 Control-signal processing device
12 Imaging device
13 Display
31 First identifying device
32 Second identifying device
32a, 32b Second imaging device
32c Range image sensor
32d Inertial sensor
33 Processed-image generating device
34 Communication device
100 Maintenance support system
M Reference point
N Telecommunication line
S, S1, S2 Apparatus related to confidential information
T Maintenance target
TA First three-dimensional area
SA Second three-dimensional area
W1, W2, W3, W4, W5, W6, W7, W8 Partition wall
θ Angle of view
DA Dead angle area
OA Outside area of imaging
EA Exception area
MA Mask area

The invention claimed is:
1. A maintenance support system comprising:
 a wearable terminal including an imaging device and worn by a maintenance worker;
 a first identifying device configured to identify a predetermined first three-dimensional area including industrial equipment that is a maintenance target, by using a SLAM technique and/or to identify a predetermined second three-dimensional area excluding the industrial equipment that is the maintenance target, by using the SLAM technique, with reference to a predetermined reference point in a captured image acquired by the imaging device in an initial state;

a second identifying device configured to identify a mask voxel area excluding an effective voxel area corresponding to the first three-dimensional area, by using the SLAM technique and/or to identify a mask voxel area corresponding to the second three-dimensional area, in a captured image acquired by the imaging device, by using the SLAM technique in a post-movement state in which the wearable terminal has moved;

a processed-image generating device configured to generate a processed image in which the mask voxel area identified by the second identifying device is made invisible for the captured image acquired by the imaging device in the post-movement state; and a communication device configured to transmit the processed image generated by the processed-image generating device to a support terminal operated by a maintenance supporter, wherein the second identifying device is configured to identify the mask voxel area excluding the effective voxel area corresponding to the first three-dimensional area and/or to identify the mask voxel area corresponding to the second three-dimensional area even if the reference point is not included in the captured image acquired by the imaging device in the post-movement state.

2. The maintenance support system according to claim 1, wherein the reference point is defined by a marker.

3. The maintenance support system according to claim 1, wherein the second identifying device comprises a plurality of second imaging devices with imaging directions different from each other, and identifies the mask voxel area based on captured images acquired by the plurality of the second imaging devices.

4. The maintenance support system according to claim 1, wherein the wearable terminal is a head-mounted display including a display, and the head-mounted display is configured to be switchable between a state in which the captured image is displayed on the display, and a state in which the processed image is displayed on the display in a visually recognizable manner.

5. The maintenance support system according to claim 1, wherein the first identifying device, the second identifying device, the processed-image generating device, and the communication device are attached to the wearable terminal.

6. The maintenance support system according to claim 1, further comprising:

the support terminal, wherein the support terminal is configured to be capable of bidirectional data communication with the communication device.

7. The maintenance support system according to claim 6, further comprising:

a server which is electrically connected to the communication device and the support terminal, and in which first identification information and second identification information are stored, the first identification information being identification information of the maintenance worker and the second identification information being identification information of the maintenance supporter, wherein the server determines whether or not identification information transmitted from the communication device to the server matches the first identification information stored in the server, and also determines whether or not identification information transmitted from the support terminal to the server matches the second identification information stored in the server, and enables bidirectional data communication between the communication device and the support terminal via the server when the identification information transmitted from the communication device to the server matches the first identification information, and the identification information transmitted from the support terminal to the server matches the second identification information.

8. A maintenance support method by use of a wearable terminal including an imaging device and worn by a maintenance worker, the maintenance support method comprising:

a first identifying step of identifying a predetermined first three-dimensional area including industrial equipment which is a maintenance target, by using a SLAM technique and/or identifying a predetermined second three-dimensional area excluding the industrial equipment which is the maintenance target, by a first identifying device, by using a SLAM technique, with reference to a predetermined reference point in a captured image acquired by the imaging device in an initial state;

a second identifying step of identifying a mask voxel area excluding an effective voxel area corresponding to the first three-dimensional area, by using a SLAM technique and/or identifying a mask voxel area corresponding to the second three-dimensional area, in a captured image acquired by the imaging device, by using a SLAM technique, by a second identifying device, in a post-movement state in which the wearable terminal has moved;

a processed-image generating step of generating, by a processed-image generating device, a processed image, wherein the mask voxel area identified in the second identifying step is made invisible for the captured image acquired by the imaging device in the post-movement state; and a communication step of transmitting, by a communication device, the processed image generated in the processed-image generating step to a support terminal, wherein in the second identifying step, the mask voxel area excluding the effective voxel area corresponding to the first three-dimensional area is identified and/or the mask voxel area corresponding to the second three-dimensional area is identified by the second identifying device, and wherein the reference point is not included in the captured image acquired by the imaging device in the post-movement state.

9. A non-transitory computer readable storage medium which stores a program for causing the first identifying device, the second identifying device, the processed-image generating device and the communication device to respectively execute the first identifying step, the second identifying step, the processed-image generating step and the communication step included in the maintenance support method according to claim 8.

10. A method for generating a processed image by using the maintenance support system according to claim 1, comprising:

in a captured image acquired by an imaging device included in a wearable terminal worn by a maintenance worker, identifying a mask voxel area excluding an effective voxel area corresponding to a predetermined first three-dimensional area including industrial equipment which is a maintenance target, by using a SLAM technique and/or identifying a mask voxel area corresponding to a predetermined second three-dimensional area excluding the industrial equipment which is the maintenance target, by using a SLAM technique and generating a processed image in which the mask voxel area is made invisible.

\* \* \* \* \*